US009998927B2

(12) United States Patent
Nakata

(10) Patent No.: US 9,998,927 B2
(45) Date of Patent: Jun. 12, 2018

(54) MOBILE COMMUNICATION APPARATUS, MAP GENERATING APPARATUS, RESOURCE MANAGEMENT APPARATUS AND WIRELESS STATION MANAGEMENT APPARATUS, FOR USE IN WIRELESS ACCESS SYSTEM

(71) Applicant: DENSO CORPORATION, Kariya, Aichi-pref. (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 339 days.

(21) Appl. No.: 14/479,892

(22) Filed: Sep. 8, 2014

(65) Prior Publication Data
US 2015/0072696 A1 Mar. 12, 2015

(30) Foreign Application Priority Data

Sep. 10, 2013 (JP) ................................. 2013-187262

(51) Int. Cl.
*H04W 16/18* (2009.01)
*H04W 4/02* (2018.01)
(Continued)

(52) U.S. Cl.
CPC ............. *H04W 16/18* (2013.01); *H04W 4/02* (2013.01); *H04W 72/048* (2013.01);
(Continued)

(58) Field of Classification Search
CPC ....... H04W 64/00; H04W 88/02; H04W 4/08; H04W 8/186; H04W 84/047; H04W 4/02; H04W 12/08; H04W 4/023; H04W 4/027; H04W 16/18; H04W 36/32; H04W 40/00; H04W 40/02; H04W 40/18; H04W 40/22; H04W 40/24; H04W 40/34; H04W 48/16;
(Continued)

(56) References Cited

U.S. PATENT DOCUMENTS 6,580,390 B1 * 6/2003 Hay ........................ G01S 19/05
342/357.31
8,953,565 B1 * 2/2015 Schlesener .......... H04L 12/6418
370/238

(Continued)

FOREIGN PATENT DOCUMENTS

AU 200071403 B2 5/2001
GB 2346511 A * 12/1999 ............. H04B 7/156

(Continued)

*Primary Examiner* — Michael Mapa
(74) *Attorney, Agent, or Firm* — Posz Law Group, PLC

(57) ABSTRACT

In a wireless communication system, a mobile communication apparatus judges the reception quality available at its current position for direct reception of information transmitted from a fixed wireless station, with the judgement based upon the current position and upon a reception quality map expressing a relationship between reception positions and corresponding reception quality values. If the reception quality at the current position is judged to be sufficient, direct reception is executed, while otherwise, a limitation is placed upon such direct reception, for example by postponing the direct reception until reaching a position at which the reception quality will be sufficient.

12 Claims, 22 Drawing Sheets

(51) Int. Cl.
  *H04W 72/04* (2009.01)
  *H04W 36/32* (2009.01)
  *H04B 7/155* (2006.01)
(52) U.S. Cl.
  CPC ......... *H04B 7/15542* (2013.01); *H04W 4/023* (2013.01); *H04W 4/027* (2013.01); *H04W 36/32* (2013.01)
(58) Field of Classification Search
  CPC . H04W 72/048; H04W 76/023; H04W 88/04; H04W 88/06; H04M 1/72519; H04L 29/08108; H04L 29/08657; H04L 67/1044; H04L 45/02; H04L 45/08; H04L 45/12; H04L 45/121; H04L 45/123; H04L 45/124; H04L 45/22; H04L 45/28; H04L 45/30; H04L 45/48; H04L 67/327; H04L 64/104; G08B 21/0247; G08B 13/1427; H04B 7/15542; H04B 7/15507
  USPC ........ 455/7, 11.1, 16, 41.2, 445, 456.1–457; 370/338, 315, 238, 351
  See application file for complete search history.

(56) References Cited

U.S. PATENT DOCUMENTS

| | | | | |
|---|---|---|---|---|
| 2004/0203998 A1* | 10/2004 | Knauerhase | ......... | H04W 36/32 455/550.1 |
| 2005/0181798 A1* | 8/2005 | Monden | ................. | H04L 45/00 455/446 |
| 2006/0259236 A1* | 11/2006 | Kaplan | ................. | G01C 21/26 701/532 |
| 2008/0188177 A1* | 8/2008 | Tan | ...................... | H04B 7/2606 455/11.1 |
| 2011/0117907 A1* | 5/2011 | Hooli | .................... | H04W 72/02 455/422.1 |
| 2011/0188398 A1* | 8/2011 | Baba | ................ | H04B 7/15542 370/252 |
| 2012/0320763 A1* | 12/2012 | Hong | .................. | H04B 5/0081 370/246 |
| 2013/0321424 A1* | 12/2013 | Pylappan | ............... | G06T 11/00 345/440 |
| 2014/0051379 A1* | 2/2014 | Ganesh | ............ | H04M 1/72538 455/404.1 |
| 2014/0200038 A1* | 7/2014 | Rao | .................... | H04L 67/2847 455/457 |
| 2015/0011220 A1* | 1/2015 | Buckle | .................. | C12M 41/48 455/436 |

FOREIGN PATENT DOCUMENTS

| | | |
|---|---|---|
| JP | 2004-248180 A | 9/2004 |
| JP | 2012-227641 A | 11/2012 |
| JP | 2013-55446 A | 3/2013 |
| JP | 2013-089133 A | 5/2013 |

* cited by examiner

FIG.5

S101 (MOBILE APPARATUS): POSITION INFORMATION RECEIVED FROM OTHER MOBILE APPARATUS X

S102: ESTIMATE THE DIRECT RECEPTION QUALITY Ad AT OWN CURRENT POSITION

S103: Ad > TH1 ?
- YES → S104
- NO → S105

S105: ACTIVATE TIMER AND ESTIMATE RELAY RECEPTION QUALITY Ca(X) FOR RECEPTION VIA MOBILE APPARATUS X

S111: RECEPTION QUALITY FOR SMALL-AREA RECEPTION > TH2 ?
- NO → S106
- YES → S112

S112: REGISTER THE RELAY RECEPTION QUALITY Ca(X)

S106: POSITION INFORMATION RECEIVED FROM A NEW MOBILE APPARATUS Y AND HAVING ESTIMATED RELAY RECEPTION QUALITY Ca(Y) WHICH EXCEEDS Ca(X) ?
- YES → S107
- NO → S115

S107: RECEPTION QUALITY FOR SMALL-AREA RECEPTION > TH2 ?
- YES → S113
- NO → S115

S115: TIMER INTERVAL Tm ELAPSED ?
- YES → S108
- NO → S106

S113: REGISTER THE RELAY RECEPTION QUALITY Ca(Y)

S114: TIMER INTERVAL Tm ELAPSED ?
- YES → S108
- NO → S106

S108: Cm = HIGHEST VALUE OF RELAY RECEPTION QUALITY REGISTERED WITHIN TIMER INTERVAL Tm

S109: DOES THE MAXIMUM VALUE Cm OF RELAY RECEPTION QUALITY EXCEED THE DIRECT RECEPTION QUALITY Ad BY MORE THAN THE PREDETERMINED AMOUNT ?
- YES → S110
- NO → S104

S110: HALT DIRECT RECEPTION FROM FIXED WIRELESS STATION IF IN PROGRESS AND BEGIN OR CONTINUE RELAY RECEPTION VIA THE MOBILE APPARATUS CORRESPONDING TO THE MAXIMUM VALUE Cm

S104: BEGIN OR CONTINUE DIRECT RECEPTION OF REQUISITE DATA FROM FIXED WIRELESS STATION

END

(MOBILE APPARATUS 21A)

(MOBILE APPARATUS 21B)

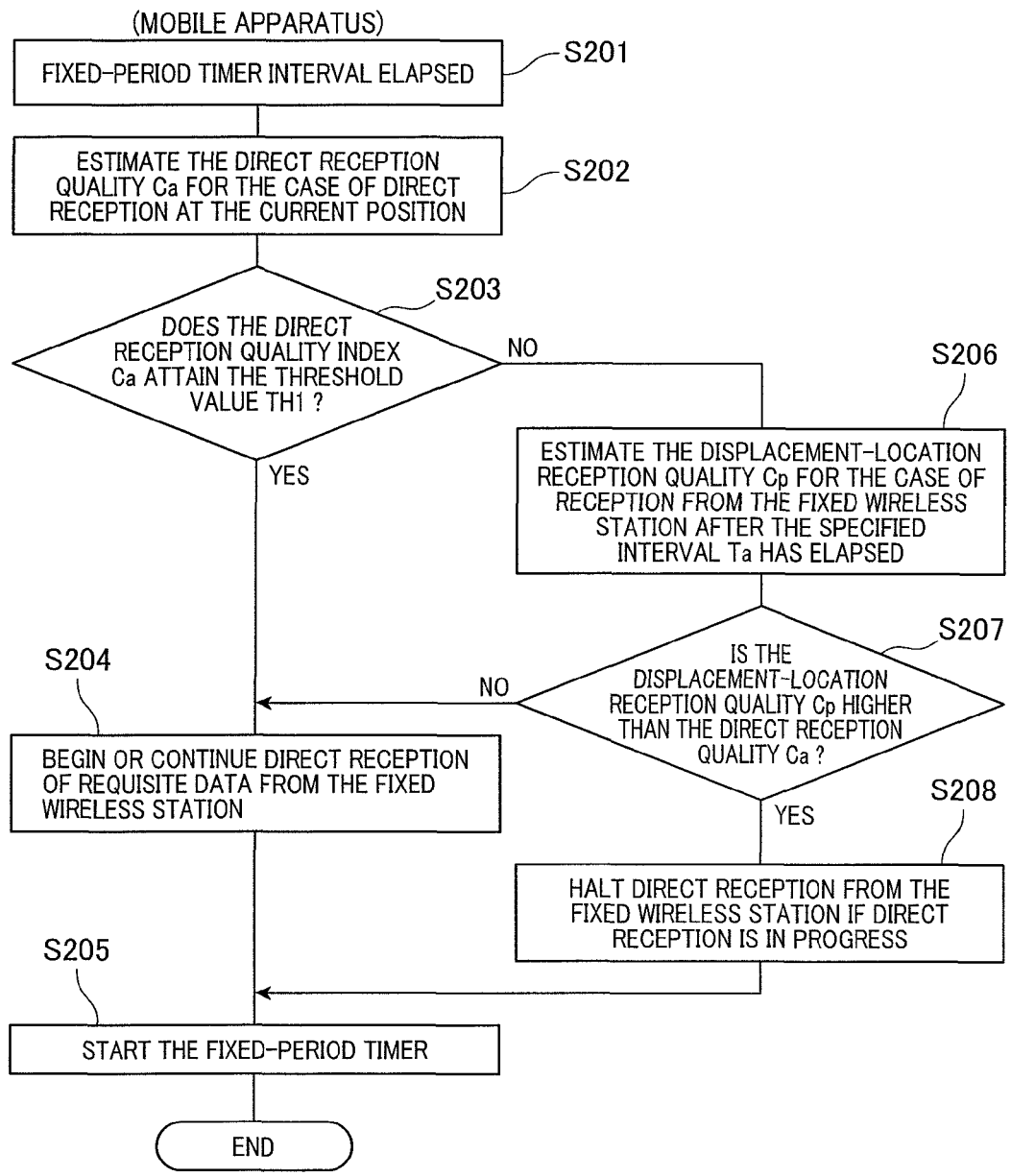

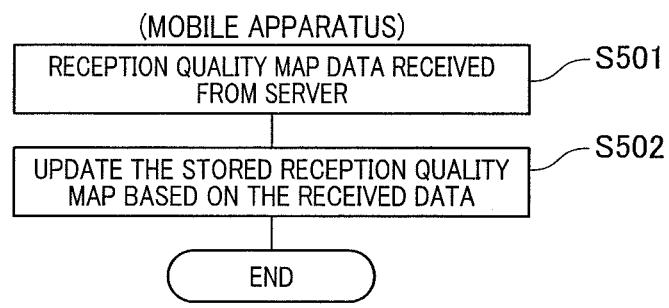
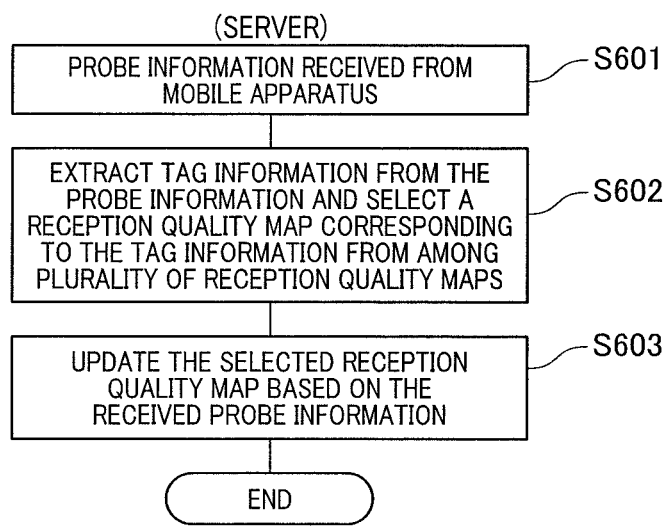

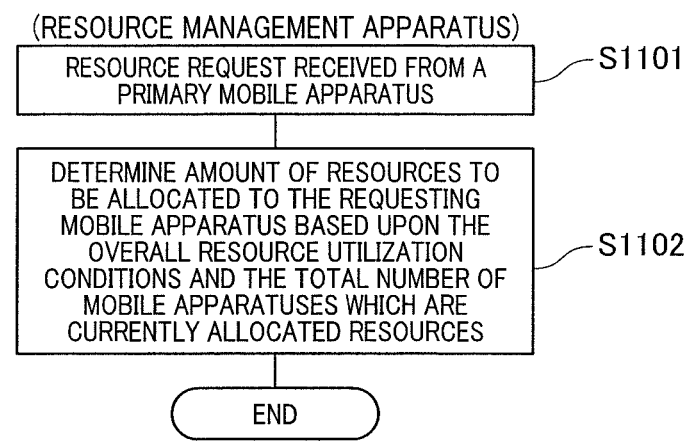
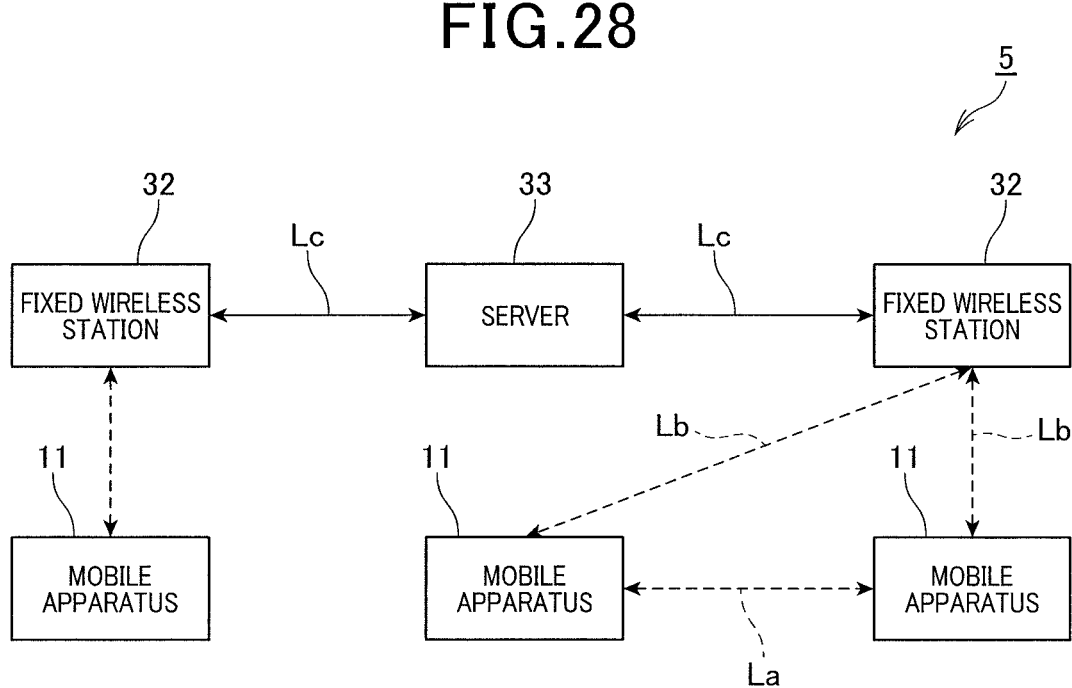

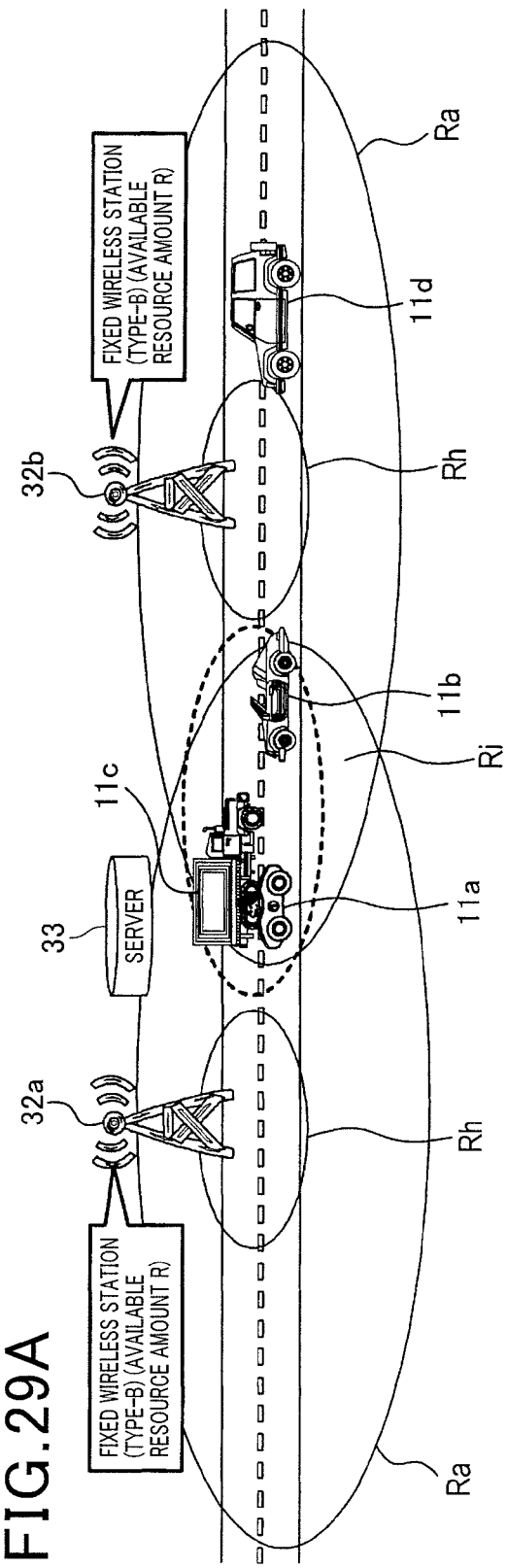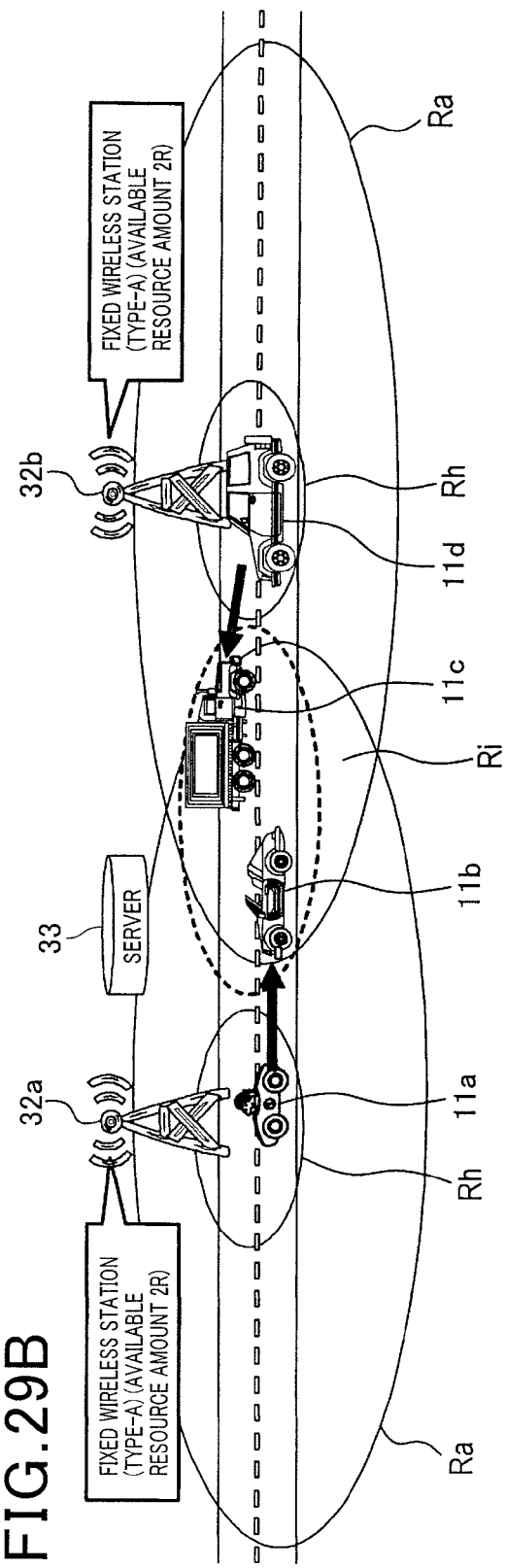

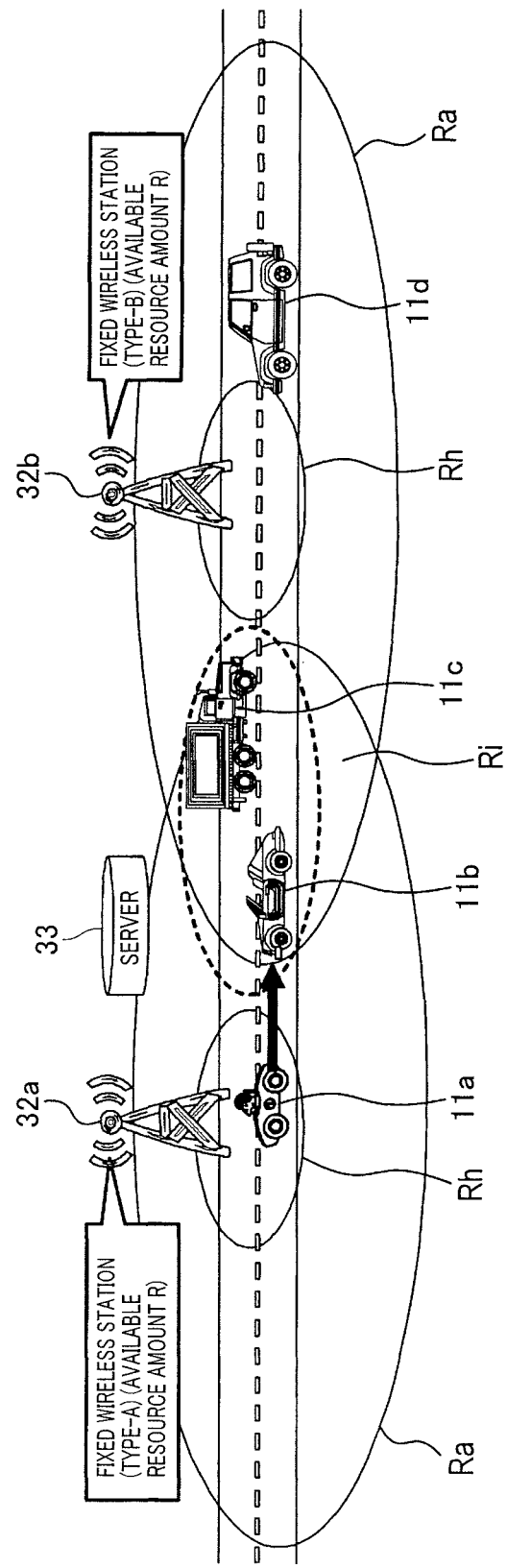

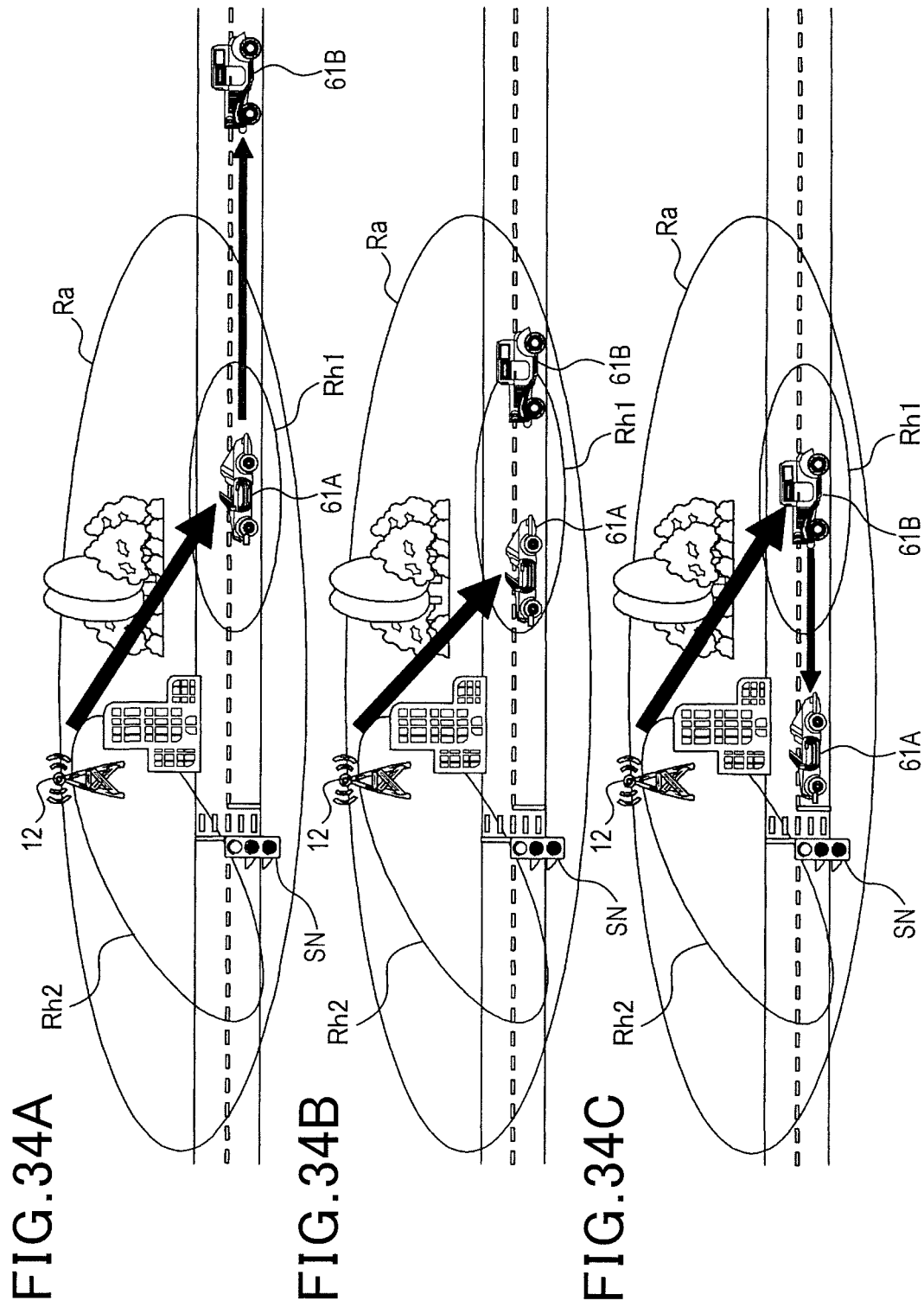

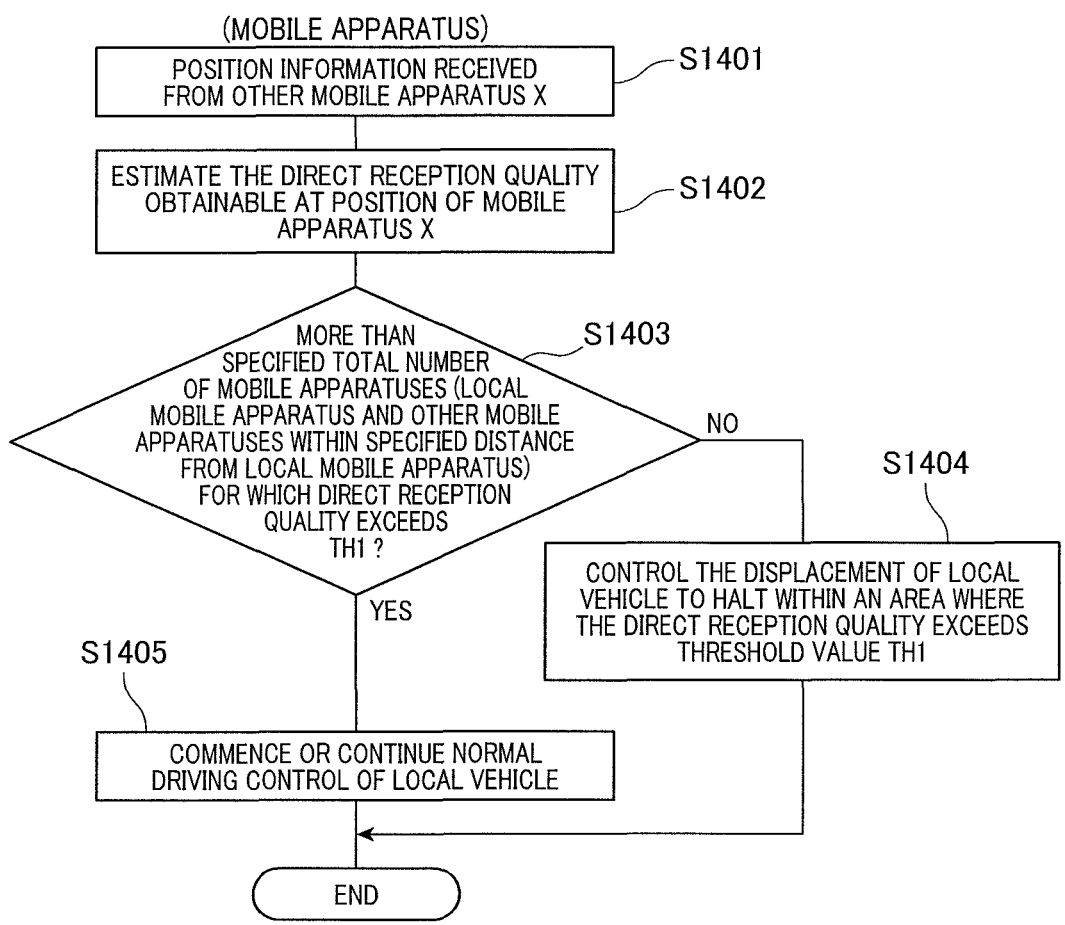

MOBILE COMMUNICATION APPARATUS, MAP GENERATING APPARATUS, RESOURCE MANAGEMENT APPARATUS AND WIRELESS STATION MANAGEMENT APPARATUS, FOR USE IN WIRELESS ACCESS SYSTEM

CROSS-REFERENCE TO RELATED APPLICATIONS

This application is based on and incorporates herein by reference Japanese Patent First Application No. 2013-187262 filed on Sep. 10, 2013.

BACKGROUND OF THE INVENTION

Field of Application

The present invention relates to a wireless access system in which mobile communication apparatuses receive information from a wireless station positioned at a fixed terrestrial location.

Description of Related Art

Types of wireless access system (cellular systems) are known in which relatively large cells (communication areas) are formed, each containing locally formed cells which cover respective small areas. For example in Japanese patent publication No. 2013-55446, a cellular system is described in which a macrocell (having a macrocell base station, i.e., main fixed wireless station) contains picocells (having respective picocell base stations, i.e., secondary fixed wireless stations) which each cover a small area, and also may contain femtocells each of which covers a smaller area than a picocell. With such a cellular system, it is possible to achieve a high average quality of reception throughout a large overall communication area of a macrocell base station by constructing one or more picocell base stations within that overall communication area. However although the areas of high-quality reception can be increased by applying that method, construction costs of the system become excessive, due to the need for the picocell base stations.

SUMMARY OF THE INVENTION

Hence it is desired to overcome the above problem, by providing a wireless access system whereby the average reception quality within an overall communication area of a fixed wireless station of the system can be increased without a consequent increase in construction costs of system.

According to a first aspect, the invention provides a mobile communication apparatus (abbreviated in the following to "mobile apparatus") for use in a wireless access system having a fixed wireless station (i.e., a wireless station positioned at a fixed terrestrial location) and a plurality of such mobile apparatuses, each mobile apparatus being provided with position detection means, map acquisition means, direct quality estimation means, and direct quality estimation means.

The position detection means of a mobile apparatus detects the current position of the apparatus. The map acquisition means acquires data expressing a reception quality map, which relates positions at which information can be directly received from the fixed wireless station to respectively corresponding values of direct reception quality obtained at these positions. Each direct reception quality value (an index value obtained based on measurement of received signal strength, etc.,) indicates the reception quality obtained when information is directly received from the fixed wireless station at the corresponding position.

The direct quality estimation means estimates the direct reception quality value corresponding to the current position of the mobile apparatus. The estimation is based upon the reception quality map data and the detected current position of the mobile apparatus. The reception processing means selects either a first reception mode (an operating mode in which information is received directly from the fixed wireless station) or a second reception mode (an operating mode whereby some limitation is placed on such direct reception). The selection is based upon the value of reception quality that is estimated by the direct reception quality estimation means.

Such a mobile apparatus can provide an overall improvement in reception quality, by comparison with the case in which information is always received directly from the mobile apparatus, irrespective of the direct reception quality obtainable at the current position of the mobile apparatus. In particular, when a plurality of such mobile apparatuses operate within the communication area of a fixed wireless station, an overall improvement in reception quality is obtained within that communication area.

For example, such a mobile apparatus may be provided with position acquisition means for communicating with another mobile apparatus and thereby acquiring the current position of the other mobile apparatus, and relay quality estimation means for estimating the reception quality (relay reception quality) obtainable if information were relayed from the fixed wireless station via that other mobile apparatus. In that case, if the relay reception quality is sufficiently higher than the direct reception quality, then the original mobile apparatus applies an operating mode (second operating mode) whereby information is received from the fixed wireless station by relay via the other mobile apparatus.

Increased reception quality can thereby be achieved, when the original mobile apparatus is currently within an area of low direct reception quality while another mobile apparatus is within an area of high direct reception quality and can readily communicate with the original mobile apparatus.

According to a second aspect, the invention provides a map generating apparatus for use in a wireless access system having a fixed wireless station and a plurality of mobile apparatuses, with the map generating apparatus including quality information acquisition means and map generating means.

The quality information acquisition means receives position quality information and status information from one or more of a plurality of mobile apparatuses which are transported by corresponding host vehicles, and also receives information directly from a fixed wireless station. The position quality information received from a mobile apparatus expresses positions at which information is received (by that mobile apparatus) directly from the fixed wireless station and the respective values of direct reception quality attained at these positions. The status information expresses various factors which affect the reception sensitivity of the mobile apparatus at the current time (i.e., at the time of detecting the transmitted value of direct reception quality by that mobile apparatus), such as the condition (orientation, etc.,) in which the mobile apparatus is mounted in its host vehicle, etc.

The map generating means generates a plurality of reception quality maps, categorized in accordance with the sets of status information respectively received from the mobile apparatuses. Each of the reception quality maps expressing a correspondence relationship between positions (i.e., terrestrial locations of the host vehicle) at which information is received directly from the fixed wireless station and corresponding values of direct reception quality obtainable at these positions.

Such a map generating apparatus enables reception quality maps to be readily generated, based on position information and corresponding values of reception quality information that are received from each of various mobile apparatuses. Furthermore, by categorizing each generated reception quality map in accordance with factors affecting the reception sensitivity of the mobile apparatuses whose information was utilized in generating that map (such as the respective installation conditions, respective motion speeds, etc., of these mobile apparatuses), improved accuracy and reliability can be achieved for the map contents.

According to a third aspect, the invention provides a resource management apparatus for use in a wireless access system having at least one fixed wireless station and a plurality of mobile apparatuses, the resource management apparatus comprising relay information acquisition means and allocation determining means. The relay information acquisition means serves to acquire information identifying each of one or more primary mobile apparatuses (i.e., mobile apparatuses currently receiving information directly from a fixed wireless station) which are relaying information from the fixed wireless station to at least one secondary mobile apparatus (i.e., a mobile apparatus which currently is in an area of low reception quality). The allocation determining means allocates an amount of communication resources (e.g., time durations, or frequencies, utilized in transmitting information to a mobile apparatus) to each primary mobile apparatus, based on the total number of secondary mobile apparatuses which are currently receiving information via that primary mobile apparatus.

Such a resource management apparatus, applied to a wireless access system, enables a more suitable allocation of communication resources than for a system in which the communication resources are allocated based only upon whether or not a mobile apparatus is currently receiving information directly from a fixed wireless station, irrespective of whether the mobile apparatus is currently functioning as a primary mobile apparatus. As a result, use of such a resource management apparatus enables enhancement of the average reception quality within the communication area of the fixed wireless station.

According to a fourth aspect, the invention provides a wireless station management apparatus for use in a wireless access system having a plurality of fixed wireless station and a plurality of mobile apparatuses, the wireless station management apparatus comprising receiving apparatus judgement means and allocation command means.

The receiving apparatus judgement means serves to judge, for each of a plurality of mobile apparatuses, whether that mobile apparatus is currently within an interference area (i.e., an area in which respective communication areas of fixed wireless stations mutually overlap, causing interference between communication resources of the fixed wireless stations) and is receiving information directly from a fixed wireless station. The allocation command means supplies commands to the fixed wireless stations for designating amounts of communication resources (i.e., specific frequencies or time intervals utilized in transmitting information to respective mobile apparatuses) which are to be allocated to the mobile apparatuses. The allocation is performed such that interference between communication resources of respective fixed wireless stations in the interference area is permitted, when the receiving apparatus judgement means determines that there is no mobile apparatus that is within the interference area and is receiving information directly from a fixed wireless station.

In particular with the present invention, when one or more mobile apparatuses are within such an interference area, interference between communication resources in that area is permitted if each of these mobile apparatuses is receiving information from a fixed wireless station by relay via a mobile apparatus positioned outside the interference area.

Use of such a wireless station management apparatus thus provides occasions when resource interference is permitted within an interference area, so that opportunities for sharing communication resources by fixed wireless stations which form an interference area become increased. Communication resources can thereby be utilized more efficiently than with the prior art, in which resource interference within an interference area must always be prevented when at least one mobile apparatuses is within the interference area and must receive information from a fixed wireless station. Hence the fifth embodiment enables an improvement in the average reception quality within the respective communication areas of the fixed wireless stations which form an interference area.

According to a fifth aspect, the invention provides a wireless access system comprising a fixed wireless station and a plurality of mobile apparatuses, each of the mobile apparatuses being capable of receiving information transmitted from the fixed wireless station and comprising position detection means, map acquisition means, direct quality estimation means, and reception processing means.

The position detection means detects the current position of the mobile apparatus. The map acquisition means serves acquires data of a reception quality map, expressing a relationship between positions at which information can be directly received from the fixed wireless station and values of reception quality respectively corresponding to these reception positions. The direct quality estimation means estimates a direct reception quality value, expressing the reception quality achieved when information is received directly from the fixed wireless station at the detected current position of the mobile apparatus. The direct reception quality is estimated based upon the reception quality map data and the detected current position. The reception processing means selects either a first or a second reception mode as an operating mode, in accordance with the estimated value of direct reception quality. The first reception mode is an operating mode in which information is received directly from the fixed wireless station, while the second reception mode is an operating mode in which a limitation is placed upon such direct reception.

Here, the term "limitation" is used in very a general sense. For example the second reception mode may be an operating mode in which information is received indirectly by a mobile apparatus from a fixed wireless station by being relayed via another mobile apparatus which is positioned in an area having high reception quality, or the second reception mode may be an operating mode in which direct reception of information from a fixed wireless station is postponed until the mobile apparatus has entered an area having sufficiently high reception quality.

Such a wireless access system enables an improvement in average reception quality within the communication area of the fixed wireless station, by comparison with a system in which information is always received by a mobile apparatus directly from a fixed wireless station, irrespective of the level of direct reception quality of the area in which the mobile apparatus is currently located.

BRIEF DESCRIPTION OF THE DRAWINGS

FIG. 5 is a flow diagram showing processing executed by a mobile apparatus of the first embodiment;

FIG. 6A is a conceptual diagram for illustrating a prior art method of increasing an area of high reception quality of a wireless access system, while

FIG. 11 is a flow diagram showing processing executed by a mobile apparatus of the second embodiment;

FIGS. 16, 17 and 18 are respective flow diagrams of processing executed by a mobile apparatus of the third embodiment;

FIGS. 19 and 20 are respective flow diagrams of processing executed by the server of the third embodiment;

FIG. 27 is a flow diagram showing secondary processing executed by the resource management apparatus of the fourth embodiment;

FIG. 28 is a block diagram showing the general configuration of a wireless access system according to a fifth embodiment;

FIGS. 29A, 29B and 29C are conceptual diagrams for use in describing the operation of the fifth embodiment;

FIGS. 34A, 34B and 34C are conceptual diagrams for use in describing the operation of the sixth embodiment; and FIG. 35 is a flow diagram showing processing executed by a mobile apparatus of the sixth embodiment.

DESCRIPTION OF PREFERRED EMBODIMENTS

1 First Embodiment 1-1 General Configuration

Figure 1:
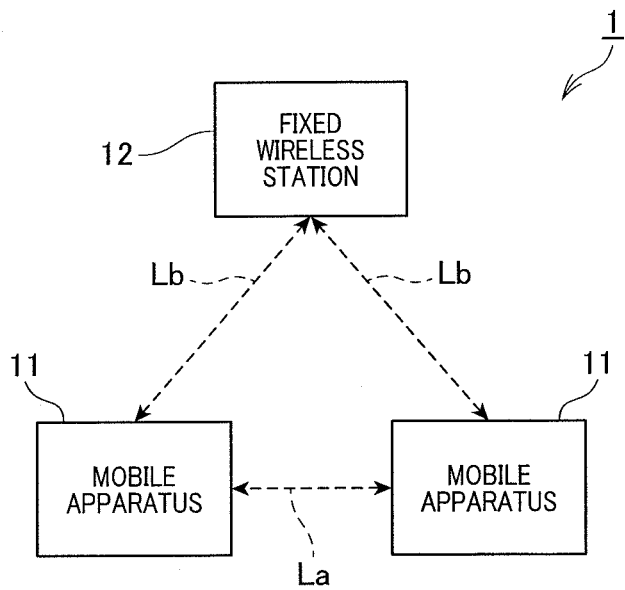
FIG. 1 is a block diagram showing the general configuration of a wireless access system according to a first embodiment of the invention.

FIG. 1 is a block diagram showing the basic features of a first embodiment of a wireless access system, designated by numeral 1. The wireless access system 1 includes a fixed wireless station 12 and a plurality of mobile apparatuses (mobile wireless communication apparatuses) 11.

Each mobile apparatus 11 is configured to be capable of performing communication operations while being transported. With this embodiment the mobile apparatuses 11 are transported in respective host vehicles, however the embodiment would be equally applicable to mobile apparatuses carried by persons (e.g., portable telephones such as smartphones, etc.). Each mobile apparatus 11 can communicate with other mobile apparatuses via a wireless communication link La.

The fixed wireless station 12 is located at a fixed terrestrial position and serves as a base station for accessing the mobile apparatuses, by communication via wireless communication links Lb, the mobile apparatuses thereby receiving requisite information transmitted from the fixed wireless station 12. The fixed wireless station 12 is also connected to a communication network such as the Internet or an intranet, etc., serving as a gateway for that communication network.

Figure 2:
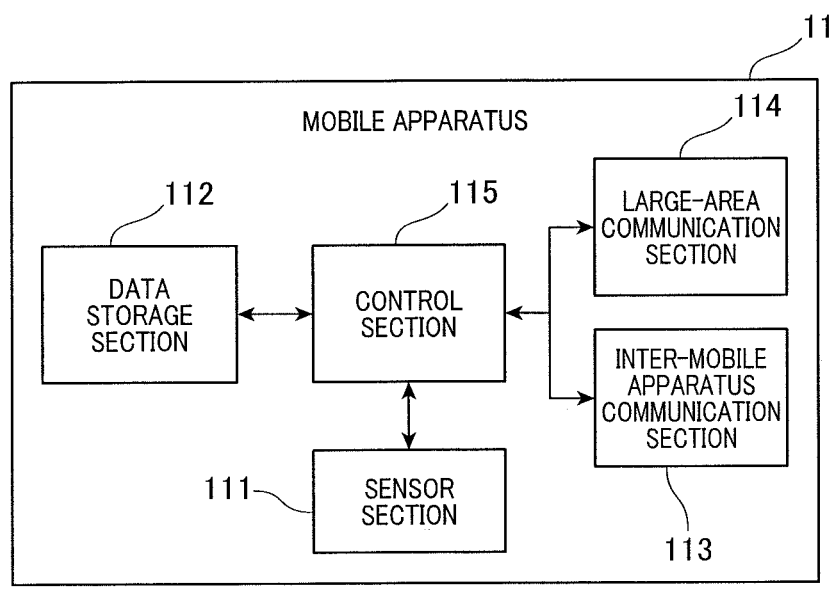
FIG. 2 is a block diagram showing the general configuration of a mobile apparatus of the first embodiment.

As shown in FIG. 2, each mobile apparatus 11 is made up of a sensor section 111, a data storage section 112, an inter-mobile apparatus communication section 113, a large-area communication section 114 and a control section 115. The sensor section 111 incorporates a GPS receiver apparatus or gyroscope apparatus (or can receive information from such an apparatus installed in the host vehicle) for detecting the current position of the mobile apparatus 11, i.e., the current position of the host vehicle of the mobile apparatus 11.

The data storage section 112 includes a data storage apparatus having data stored therein expressing one or more reception quality maps. A reception quality map expresses a correspondence relationship between positions at which information can be received directly by wireless communication from the fixed wireless station 12 and respective values of direct reception quality (reception quality obtained by a mobile apparatus when receiving information directly transmitted from the fixed wireless station 12) at these positions. Reception quality is expressed as an index value, which may be a measure of received signal strength, signal-to-noise ratio, transmission delay, bandwidth required by respective resources, amount of delay jitter, reception drop-out rate, etc., or a combination of two or more of these.

Each reception quality map is a memory map which, for the purposes of describing this embodiment, is assumed to be a contour map of direct reception quality values obtained at respective positions in a specific part of the communication area of the fixed wireless station 12. However it would be equally possible for a reception quality map to express direct reception quality values corresponding only to positions located along routes which can be traveled by a vehicle which transports a mobile apparatus 11, i.e., positions which are along specific roads within the communication area of the fixed wireless station, with reception quality values corresponding to other positions within the communication area of the fixed wireless station 12 being omitted.

With this embodiment, data expressing a reception quality map are transmitted directly from the fixed wireless station 12 (i.e., with the map data originating from the fixed wireless station) to a mobile apparatus 11 when required. However as described hereinafter, it would be equally possible for the map data to be transmitted from a server via the fixed wireless station 12. When received by a mobile apparatus 11, the reception quality map is stored in the data storage section 112. In addition, the host vehicle of a mobile apparatus 11 may be equipped with a data storage apparatus (not shown in the drawings) which stores geographic map data for use by a vehicle navigation apparatus, etc., with the data storage section 112 of the mobile apparatus 11 acquiring the geographic map data when required.

The inter-mobile apparatus communication section 113 of a mobile apparatus 11 performs small-area (i.e., relatively short-range) wireless communication with other mobile apparatuses installed in other host vehicles, for exchanging information expressing the respective current positions of the mobile apparatuses, etc. The wireless communication executed by the inter-mobile apparatus communication section 113 can utilize a wireless standard such as that of a known type of wireless LAN (Local Area Network), the 700 MHz frequency band high-level road traffic system standard (ARIB STD T-109), etc.

The large-area communication section 114 of a mobile apparatus 11 executes large-area (i.e., relatively long-range) communication with the fixed wireless station 12. The control section 115 includes a CPU, ROM, RAM, etc., and the CPU executes processing in accordance with a program held in a storage medium such as the ROM, etc., to perform overall control of the mobile apparatus 11.

Figure 3:
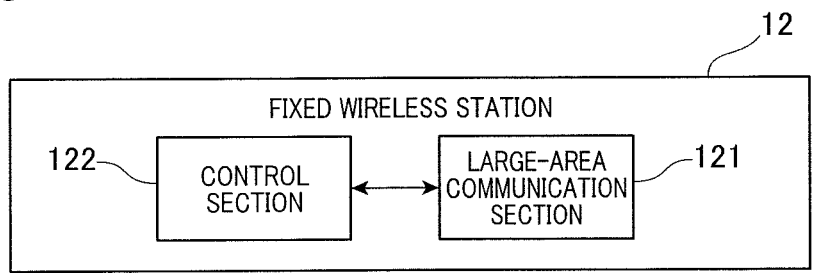
FIG. 3 is a block diagram showing the general configuration of a fixed wireless station of the first embodiment.

As shown in FIG. 3, the fixed wireless station 12 includes a large-area communication section 121 and a control section 122, with the large-area communication section 121 executing large-area communication with the mobile apparatuses 11.

The control section 122 is formed of a CPU, ROM, RAM, etc., the CPU executing processing in accordance with a program held in a storage medium such as the ROM, etc., to perform overall control of the fixed wireless station 12. For example, the control section 122 controls the large-area communication section 121 such as to enable the fixed wireless station 12 to perform wireless communication with any mobile apparatus 11 which requests direct communication with the fixed wireless station 12.

1-2 Outline

The features of processing executed by the wireless access system 1 of this embodiment will be described in the following. The fixed wireless station 12 can for example download geographic map data to a mobile apparatus 11, for use by vehicle navigation equipment of the host vehicle, and can receive (e.g., via the Internet) streaming distribution data, driving support data, data for use in for automatic driving of vehicles, etc., and transmit such data to the mobile apparatuses.

Within the overall communication area of the fixed wireless station 12, i.e., an area within which a mobile apparatus 11 can receive information directly transmitted from the fixed wireless station 12 (in general, an area centered on the location of the fixed wireless station 12) the reception quality may not be uniform, but will vary in accordance with reception positions. With the present embodiment a mobile apparatus 11 can select, as an operating mode, one of two modes respectively designated as the No. 1 reception mode and the No. 2 reception mode. With the No. 1 reception mode, data are received directly from the fixed wireless station 12. With the No. 2 reception mode, data are relayed from the fixed wireless station 12 via another mobile apparatus 11.

Figure 4A:
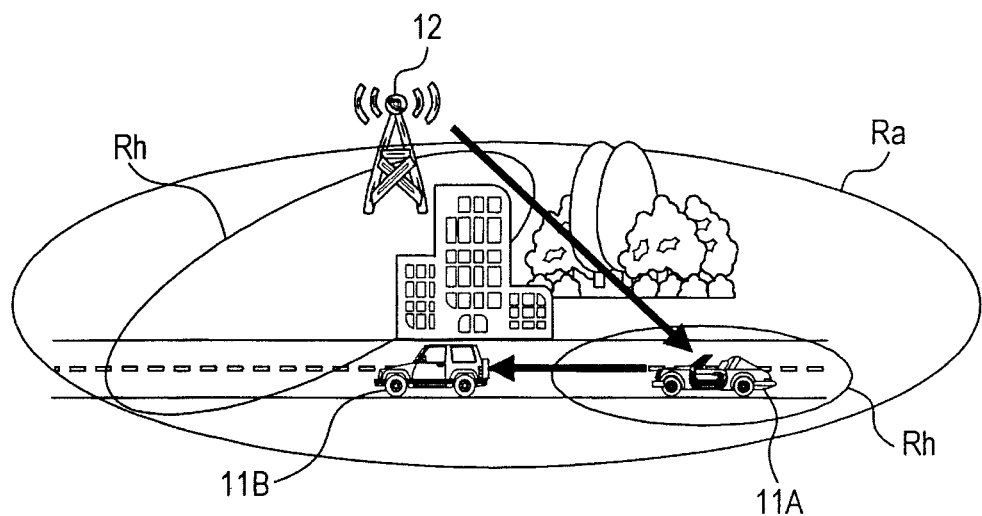
FIGS. 4A, 4B are conceptual diagrams for use in describing the operation of the first embodiment.

For example referring to FIG. 4A, the overall communication area Ra of the fixed wireless station 12 contains high-quality communication areas Rh in which the reception quality (i.e., for direct reception) is relatively high, with the reception quality in other parts of the communication area Ra being relatively low. A mobile apparatus 11a is currently positioned in an area Rh of high reception quality, and hence the mobile apparatus 11a selects the No. 1 reception mode, for receiving information directly from the fixed wireless station 12. A mobile apparatus 11b is located within the overall communication area Ra of the fixed wireless station 12, in an area in which the reception quality is comparatively low. The mobile apparatus 11b is sufficiently close to the mobile apparatus 11a for small-area communication with the mobile apparatus 11a, and hence the mobile apparatus 11a and mobile apparatus 11b exchange information including position information expressing their respective current locations. As a result, the mobile apparatus 11b selects the No. 2 reception mode, so that information is relayed from the fixed wireless station 12 to the mobile apparatus 11b via the mobile apparatus 11a.

Figure 4B:
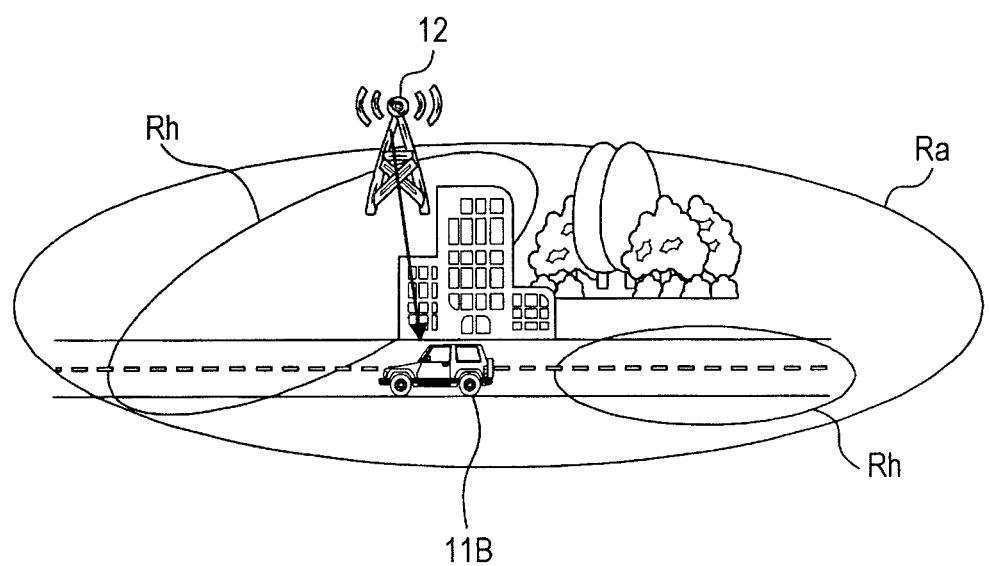

On the other hand, as shown in FIG. 4B, if the mobile apparatus 11b is within a low reception quality area but cannot execute small-area wireless communication with another mobile apparatus 11 located in a higher-quality reception area, the mobile apparatus 11b selects the No. 1 reception mode, for directly receiving information transmitted from the fixed wireless station 12.

In the descriptions of this and other embodiments of the invention, it should be understood that commencement or continuing of direct reception or relayed reception of data by a mobile apparatus occurs only when specific data are required to be received by the mobile apparatus from a fixed wireless station.

1-3 Processing

A specific example of processing executed in accordance with a stored program by the control section 115 of a mobile apparatus 11 of this embodiment will be described referring to the flow diagram of FIG. 5.

The processing commences (step S101) when the mobile apparatus 11 receives information by small-area wireless communication from another mobile apparatus, designated as X, including information expressing the current position of the mobile apparatus X. The mobile apparatus 11 also transmits information expressing its own current position (i.e., position of the host vehicle of the mobile apparatus 11) to the mobile apparatus X. The mobile apparatus 11 then, using its own current position in conjunction with reception quality map data (read out from the data storage section 112) estimates the direct reception quality Ad that is achieved at the current position of the mobile apparatus 11 (step S102).

The control section 115 then judges whether or not the direct reception quality Ad exceeds a predetermined threshold value TH1. If TH1 is exceeded (YES decision) operation proceeds to step S104 in which the No. 1 reception mode is selected as the operating mode, and the control section 115 then commences direct reception of requisite data from the fixed wireless station 12 or continues the direct reception if already in progress. The processing of FIG. 5 is then ended.

If the control section 115 judges in step S103 that the direct reception quality Ad does not exceed TH1 (NO decision) operation proceeds to step S105, in which the control section 115 estimates the reception quality (referred to in the following as the relay reception quality) for the case in which data would be received from the fixed wireless station 12 by relay via the other mobile apparatus X. The estimate is based on the current position of the other mobile apparatus X (as acquired in step S101) in conjunction with the reception quality map data.

However with this embodiment, instead of simply estimating the relay reception quality with respect to the current position of the mobile apparatus X, a relay reception quality value Ca(X) is calculated as the average relay reception quality within a predetermined travel distance L, measured from the current position of the mobile apparatus X. The reason for this is as follows. Even if the current position of the mobile apparatus X is within an area Rh of high reception quality, it is possible that the mobile apparatus X will soon exit from that area Rh, after the position information of the mobile apparatus X has been received by the mobile apparatus 11.

The travel distance L may be specified as a straight line extending from the current position of the mobile apparatus X, or as a distance along the route which will be traversed by the mobile apparatus X.

If the travel distance L is specified as a linear distance, the inter-mobile apparatus communication section 113 of the mobile apparatus 11 receives direction information indicating the travel direction of the mobile apparatus X, in addition to the position information, by small-area wireless communication with the mobile apparatus X. The control section 115 of the mobile apparatus 11 then defines a linear range, of length equal to the travel distance Lm, extending from the current position of the mobile apparatus X along the travel direction of the mobile apparatus X, and sets successive detection points at successive unit distances within that range. The control section 115 then estimates the respective values of relay reception quality at each of these detection points, by referring to the reception quality map. The average of these relay reception quality values is then calculated, as Ca(X).

Alternatively, if the travel distance L is specified as a (non-linear) distance measured along the travel route of the mobile apparatus X, then the inter-mobile apparatus communication section 113 of the mobile apparatus 11 receives route information indicating the travel route of the mobile apparatus X, in addition to the position information, by small-area wireless communication with the mobile apparatus X. The control section 115 of the mobile apparatus 11 then defines a range, of length equal to the travel distance L, extending from the current position of the mobile apparatus X along the travel route of the mobile apparatus X, and sets successive detection points at unit distances within that range. The control section 115 then estimates the values of relay reception quality at each of these detection points, by referring to the reception quality map. The average value of these estimated values is then calculated, as Ca(X).

That value of Ca(X) is then registered, for use in the current execution of a judgement step S106 and possibly for use in subsequent executions of step S106 (in subsequent executions of the processing of FIG. 5, when position information is received from respective other mobile apparatuses) as will be understood from the following description of that judgement step.

The invention is not limited to estimating the relay reception quality Ca(X) within the travel distance L. For example, it would be possible to estimate Ca(X) within a predetermined travel time Tc. In that case, in addition to the position information and travel direction information or route information, the inter-mobile apparatus communication section 113 of the mobile apparatus 11 receives speed information indicating the running speed V of the other mobile apparatus X, by small-area wireless communication with the mobile apparatus X. The control section 115 of the mobile apparatus 11 then calculates a travel distance L for the mobile apparatus X in accordance with the running speed V and the travel time Tc, instead of using a fixed value of L. The control section 115 then uses the calculated value L to obtain a relay reception quality value Ca(X) by averaging, as described above. By comparison with the case in which the running speed V of the mobile apparatus X is not taken into consideration, the relay reception quality obtainable from the mobile apparatus X can be more accurately estimated.

However instead of utilizing one of the predictive/averaging methods described above, it would be equally possible for the mobile apparatus 11 to estimate the relay reception quality based only on the current position of the mobile apparatus X.

Following step S105 a decision is made (step S106) as to whether position information has been received from any other mobile apparatus Y within a fixed-duration interval Tm extending from a preceding time point up to the current time point (i.e., up to the point at which the position information of mobile apparatus X was received), with that other mobile apparatus Y providing an estimated relay reception quality Ca(Y) which exceeds Ca(X). (The time interval Tm is used in order to exclude outdated information).

If position information has been received from at least one such other mobile apparatus Y during the interval Tm (YES decision in step S106), step S107 is then executed. Otherwise (NO decision in step S106), step S111 is then executed.

In step S107, the reception quality obtainable for small-area wireless communication with the mobile apparatus X is estimated (e.g., based on the reception quality of signals being received from the mobile apparatus X) and judged. If that reception quality exceeds a predetermined threshold value TH2 (YES decision), step S108 is then executed. Otherwise (NO decision in step S107), step S111 is then executed.

In step S108, a value Cm is updated to the relay reception quality value Ca(X), where Cm is the maximum value of estimated relay reception quality provided by any mobile apparatus from which position information has been received within the interval Tm.

In step S111, Cm is updated to the highest value of relay reception quality obtained for any mobile apparatus from which position information was received during the interval Tm (i.e., prior to receiving the position information from mobile apparatus X).

Following step S108 or step S111, step S109 is executed in which a decision is made as to whether the updated value of Cm exceeds the direct reception quality Ad by more than a predetermined amount. If it does not (NO decision), step S104 (begin or continue operation in direct reception mode) is executed.

Thus, even if the direct reception quality Ad is judged to not exceed the threshold value TH1 in step S103, the No. 1 operation mode (direct reception) is selected if it is judged that Cm is insufficient or that the reception quality for small-area wireless communication is insufficient, i.e., if it is judged that currently there is no mobile apparatus which can provide sufficiently high relay reception quality.

If Cm exceeds the direct reception quality Ad by more than the predetermined amount (YES decision in step S109), step S110 is executed. In step S110, direct reception of requisite information from the fixed wireless station 12 is halted, if in progress, and relay reception of that information from the fixed wireless station 12 is commenced (i.e., the No. 2 reception mode is set as the operation mode) via the mobile apparatus 11 which provides the relay reception quality Cm.

The relay reception is initiated by transmitting a relay request to the mobile apparatus 11 whose relay reception quality (registered in a previous execution of the processing of FIG. 5 as described above) corresponds to Cm. If relay reception has previously commenced via another mobile apparatus 11, it is halted, and relaying of information via the new mobile apparatus 11 is commenced, i.e., via the mobile apparatus 11 which currently will provide the highest relay reception quality.

Following step S104 or step S110, this execution of the processing of FIG. 5 is ended.

1-4 Effects

The following effects are provided by this embodiment.

[1A] A mobile apparatus 11 transported by a vehicle can select either direct reception or relay reception of information from a fixed wireless station 12, with the selection decision being made based on the current position of the mobile apparatus 11 (i.e., of the host vehicle of the mobile apparatus 11). By comparison with the case in which information is always received directly from the fixed wireless station 12 irrespective of the reception quality at the current position of the mobile apparatus 11, the reception quality can be enhanced. As a result, the average reception quality within the overall communication area of a fixed wireless station can be increased.

Figure 6A:
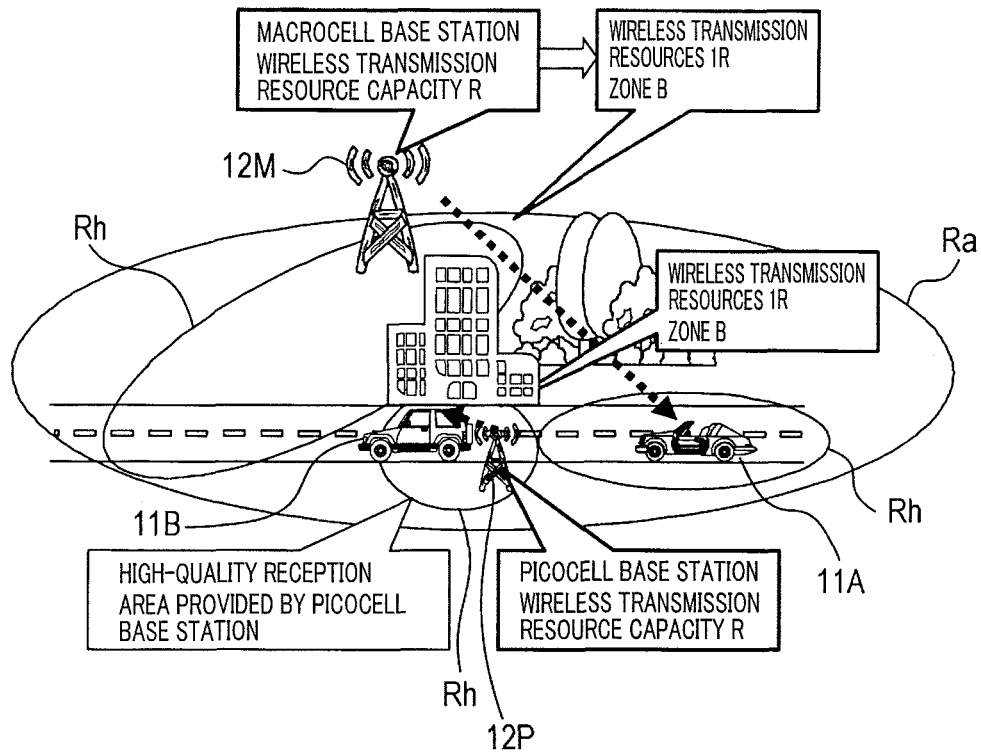

With the prior art, as illustrated in FIG. 6A, areas Rh of high-quality reception corresponding to a main fixed wireless station (macrocell base station) 12M can be increased by constructing one or more secondary fixed wireless stations (picocell base stations) 12P, each having a small communication area that is within the overall communication area Ra of the main fixed wireless station 12M. However this has the disadvantage of high construction costs for the picocell base stations. In addition, it is difficult to predict how electromagnetic waves will be propagated by the various fixed wireless stations, and in addition there may be limitations on the locations at which the picocell base stations can be constructed. Hence it becomes difficult to provide high-quality reception throughout large parts of the overall communication area Ra.

Figure 6B:
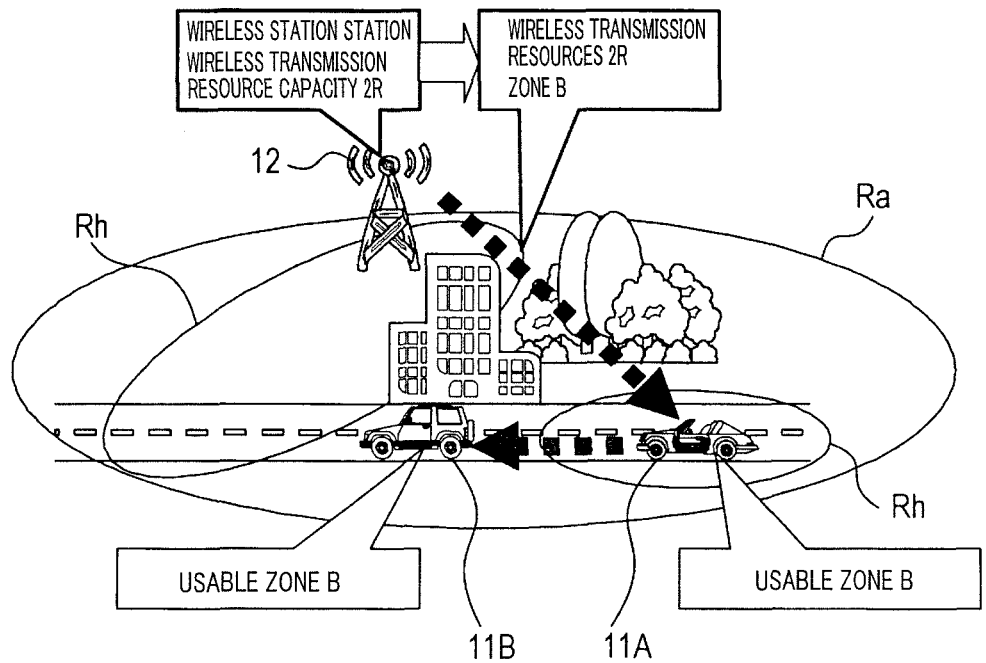
FIG. 6B is a corresponding conceptual diagram illustrating effects obtained by the first embodiment.

However as illustrated in FIGS. 6A, 6B, the wireless access system of the first embodiment enables a reduction of the wireless transmission resources utilized for transmitting to areas where reception is difficult (e.g., due to obstruction of radio waves by intervening high buildings, etc.), thereby enabling an increase in the resources devoted to transmitting into unobstructed areas. The term "wireless transmission resources" is used in a general sense, signifying for example the level of radio wave transmission power that is generated by a fixed wireless station and the height and/or number of the transmitting antennas of the station.

Hence, assuming similar wireless transmission resources of a macrocell base station, the invention enables increased direct reception quality to be achieved in unobstructed areas (such as area Rh in FIG. 6B) while use of relay reception enables a high quality of reception to be generally obtainable in the obstructed areas. Thus for example both of the mobile apparatuses 11A, 11B shown in FIG. 6B are within areas of high reception quality (indicated as usable zones B).

The first embodiment thereby enables infrastructure costs to be reduced, since secondary fixed wireless stations (picocell base stations) are made unnecessary, and greater efficiency of utilizing wireless resources enables the average level of reception quality within the overall communication area of a fixed wireless station to be increased.

With the above embodiment, a first mobile apparatus 11 can acquire the current position of a second mobile apparatus 11, which may perform a relay function (step S101), the current position information being derived by a sensor section 111 of the second mobile apparatus 11 and transmitted to the first mobile apparatus 11. The direct reception quality obtainable at the current position of the second mobile apparatus 11 is estimated by the first mobile apparatus 11, based on data of a previously acquired reception quality map (step S103). If that direct reception quality exceeds a predetermined threshold value (TH1), the first mobile apparatus 11 selects the No. 1 reception mode as its operating mode (direct reception of information transmitted from a fixed wireless station). Otherwise, the first mobile apparatus 11 selects either the No. 1 reception mode or the No. 2 reception mode as its operating mode, with the selection being based on comparing the estimated direct reception quality with an estimated relay reception quality (reception quality for the case of information being relayed to the first mobile apparatus 11 via the second mobile apparatus 11). If the No. 2 reception mode is selected, information is relayed to the first mobile apparatus 11 via the second mobile apparatus 11.

Furthermore with the above embodiment, if the No. 2 reception mode is selected, and position information has been received from one or more other mobile apparatuses during a fixed time interval preceding the time of receiving the position information of the second mobile apparatus 11, and if any of such other mobile apparatuses are estimated to provide a higher value of relay reception quality than the second mobile apparatus 11, then relay reception is executed using the one of these other mobile apparatuses which will provide the highest value of relay reception quality.

As a result, even if a mobile apparatus is currently at a position where there is a low level of direct reception quality, a higher level of reception quality can be achieved through relaying than would otherwise be possible.

With respect to the appended claims, an apparatus such as a GPS vehicle navigation apparatus in the sensor section 111 of a mobile apparatus 11 corresponds to a position detection circuit section. The data storage section 112 and large-area communication section 114, in conjunction with the control section 115 in executing the processing of steps S501 and S502 of FIG. 2, correspond to a map acquisition circuit section. The inter-mobile apparatus communication section 113, in conjunction with the control section 115 in executing the processing of step S101 of FIG. 5, corresponds to a position acquisition circuit section. The control section 115, in executing the processing of step S102 of FIG. 5, corresponds to a direct reception quality estimation circuit section, in executing the processing of steps S103 and S109, corresponds to a reception processing circuit section, and in executing the processing of step S105, corresponds to a relay quality estimation circuit section.

2 Second Embodiment

2-1 Configuration

A second embodiment has a configuration basically similar to the first embodiment, and components corresponding to those of the first embodiment are indicated by corresponding designations to those of the first embodiment in the following, with detailed description omitted.

Figure 7:
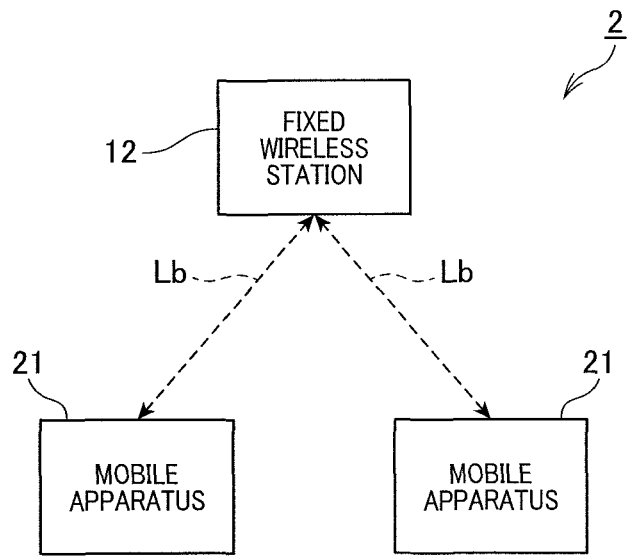
FIG. 7 is a block diagram showing the general configuration of a wireless access system according to a second embodiment.

As shown in FIG. 7, as for the wireless access system 1 of the first embodiment, the wireless access system 2 of the second embodiment is made up of a fixed wireless station 12 and a plurality of mobile apparatuses, here designated by numeral 21. The second embodiment differs from the first embodiment in that, with the second embodiment, each mobile apparatus 21 is not configured to enable communication with other mobile apparatuses 21 via a link La, such communication being made unnecessary. The configuration of the fixed wireless station 12 is identical to that of the first embodiment (FIG. 3).

Figure 8:
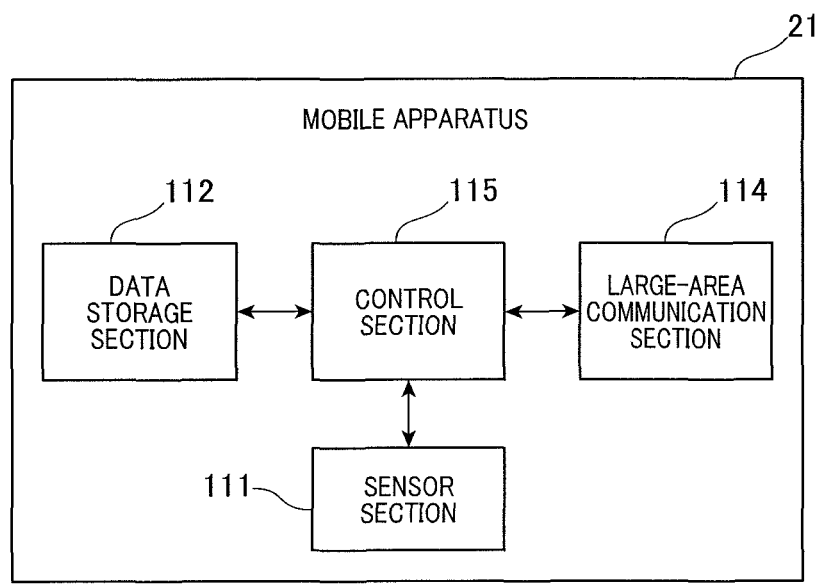
FIG. 8 is a block diagram showing the general configuration of a mobile apparatus of the second embodiment.

As shown in FIG. 8, each mobile apparatus 21 is basically made up of a sensor section 111, a data storage section 112, a large-area communication section 114 and a control section 115, with the inter-mobile apparatus communication section 113 of the first embodiment being omitted.

2-2 Outline

As for the first embodiment, each mobile apparatus 21 of the second embodiment can select as its operating mode either the No. 1 reception mode (for direct reception of information from the fixed wireless station 12) or a No. 2 reception mode. However with the second embodiment, the No. 2 reception mode is an operating mode in which, if necessary, a mobile apparatus 21 waits before attempting to receive requisite information from the fixed wireless station 12, until it becomes possible to receive the information (directly) from the fixed wireless station 12 with a sufficiently high reception quality.

Figure 9A:
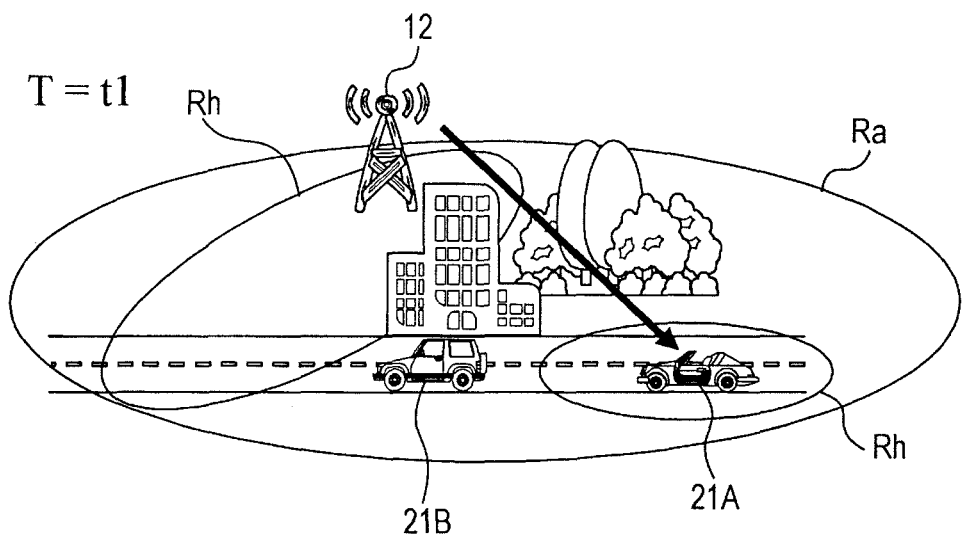
FIGS. 9A, 9B are conceptual diagrams illustrating an operating mode of the second embodiment whereby a mobile apparatus postpones reception of information from a fixed wireless station until an area of high reception quality is entered.
Figure 9B:
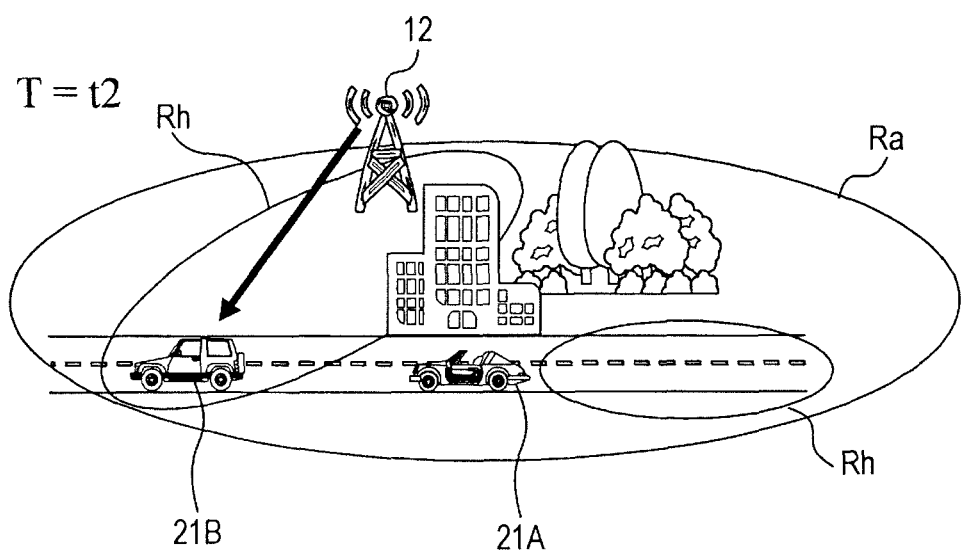

In the example of FIGS. 9A, 9B, a mobile apparatus 21A and a mobile apparatus 21B are moving through the overall communication area Ra of a fixed wireless station 12. At the time (t1) of the condition illustrated in FIG. 9A, the mobile apparatus 21A is currently located within an area Rh of high reception quality, and so selects the No. 1 reception mode (direct reception mode). At that time, the mobile apparatus 21B is located in a low-quality reception area. However it is predicted (e.g., based on the current position and speed of the host vehicle of the mobile apparatus 21B, traffic conditions ahead of the vehicle, etc.,) that only a short interval will elapse until the mobile apparatus 21B enters an area Rh of high reception quality. Hence, the mobile apparatus 21B selects the No. 2 reception mode, to wait until information can be received directly from the fixed wireless station 12 with a high reception quality. If the delay until the mobile apparatus 21B enters an area Rh of high reception quality is estimated to exceed a predetermined duration, the No. 1 reception mode (direct reception) is selected.

In the example of FIG. 9B, subsequent to the condition illustrated in FIG. 9A, the mobile apparatus 21A has entered an area of low reception quality and so terminates direct reception of information from the fixed wireless station 12 and enters the waiting state. On the other hand, the mobile apparatus 21B has entered an area Rh of high reception quality, and so commences direct reception of information from the fixed wireless station 12.

Figure 10A:
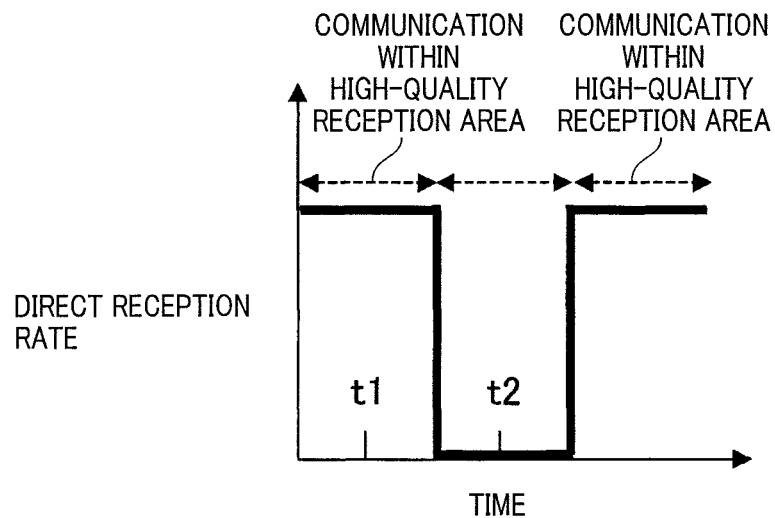
FIGS. 10A, 10B are timing diagrams for illustrating respective information to reception rates of two mobile apparatuses while moving through areas of respectively different reception quality, with the second embodiment.
Figure 10B:
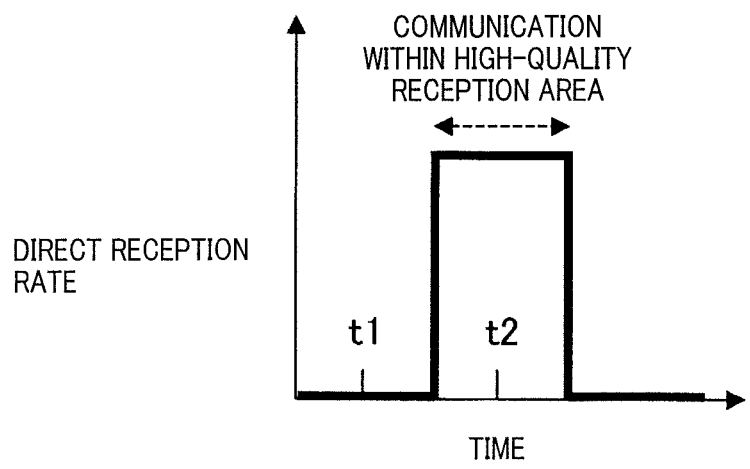

That is, as illustrated in FIGS. 10A, 10B while a mobile apparatus 21 is passing through an area Rh of high reception quality, it directly receives information from the fixed wireless station 12. However after the mobile apparatus 21 enters an area of low reception quality, it halts direct reception of information from the fixed wireless station 12 while passing through the area of low reception quality.

2-3 Processing

A specific example of processing executed by the control section 115 of a mobile apparatus 21 of this embodiment, in place of the processing of FIG. 5 above, will be described referring to the flow diagram of FIG. 11. The processing of steps S202 to S204 is identical to that of steps S102 to S104 in FIG. 5, so that description is omitted.

The processing is commenced (step S201) periodically, each time a fixed-duration timer period elapses. Firstly (step S202) the control section 115 estimates the direct reception quality Ca at the current position. The reception quality Ca is then judged (step S203) and if found to exceed the threshold value TH1 (YES decision), direct reception of information from the fixed wireless station 12 is commenced, or is continued if already in progress (step S204). Next, the control section 115 restarts the timer (step S205), and the processing of FIG. 11 is ended.

However if the reception quality Ca is judged not to exceed the threshold value TH1 (NO decision in step S203), operation then proceeds to step S206. In step S206, the control section 115 estimates a reception quality value referred to in the following as the displaced-position reception quality Cp. This is the value of direct reception quality which is expected to be obtained after a fixed time interval Ta has elapsed. This estimate of Cp is based on a displacement position Pa (the position predicted to reached by the mobile apparatus 21 when the interval Ta has elapsed) in conjunction with reception quality map data (acquired beforehand and read out from the data storage section 112 as described for the first embodiment). The displacement position Pa is estimated based on the running speed and travel direction or travel route of the mobile apparatus 21. The duration of the interval Ta is determined within an allowable range of values, i.e., such that the maximum amount of delay before recommencing reception will be within an allowable range. The appropriate duration of the interval Ta differs in accordance with such factors as the type of application which will use the information obtained from the fixed wireless station 12, etc.

With this embodiment, instead of simply estimating the displaced-position reception quality Cp as the quality expected to be obtained at the displacement position Pa, the average value of direct reception quality within a predetermined travel distance L extending beyond the displacement position Pa is estimated (step S206). The reason for this is as follows. Even if the displacement position Pa is located within an area Rh of high reception quality, it is possible that the mobile apparatus 21 will soon exit from that area after reaching the position Pa.

The distance L may be predetermined as a linear distance extending from the displacement position Pa, or may be defined as a distance extending along the travel route of the mobile apparatus 21 from the displacement position Pa.

If the distance L is defined as a linear distance, the control section 115 sets detection points at successive unit distances within the range of L, and estimates respective values of direct reception quality for each of these detection points, by referring to the reception quality map data. The average of these reception quality values is then calculated as the displaced-position reception quality Cp.

Similarly, if the distance L is defined along the travel route of the mobile apparatus 21, the control section 115 sets detection points at unit distances within the range of L, and estimates respective values of direct reception quality for each of these detection points by referring to the reception quality map. The average of these reception quality values is then calculated as the displaced-position reception quality Cp.

The invention is not limited to estimating the displaced-position reception quality Cp within the distance L. For example, it would be possible to estimate the displaced-position reception quality Cp within a predetermined travel time Tc. In that case, instead of using a fixed travel distance L, the control section 115 would use a travel distance L(V), which is the distance that would be traveled during the time Tc at the (current) running speed V of the mobile apparatus 21. By comparison with the case in which the running speed is not taken into consideration, the reception quality obtainable with the displacement position Pa can be more accurately estimated.

Alternatively, it would be possible to simply calculate the displaced-position reception quality Cp as the value of direct reception quality estimated to be obtained at the displacement position Pa.

Next (step S207), the control section 115 judges whether the displaced-position reception quality Cp is higher than the direct reception quality Ca at the current position of the mobile apparatus 21 by more than a predetermined amount. If it is not (NO decision), step S204 is then executed and the No. 1 reception mode (direct reception) is selected. Thus, even if the direct reception quality Ca does not exceed the threshold value TH1, the No. 1 reception mode is selected if the displaced-position reception quality Cp is judged to be insufficient, based on comparing the displaced-position reception quality Cp and the direct reception quality Ca at the current position. The period timer is then restarted (step S205) and the processing of FIG. 11 is ended.

However if it is judged that the direct reception quality Ca at the displaced-position reception quality Cp is higher than at the current position of the mobile apparatus 21 by more than the predetermined amount (YES decision in step S207), operation then proceeds to step S208, and the No. 2 reception mode is selected. With this embodiment, when the No. 2 reception mode is selected as the operating mode, the control section 115 halts direct reception of data from the fixed wireless station 12, if currently in progress (step S208). The period timer is then restarted (step S205) and the processing of FIG. 11 is ended.

2-4 Effects

With the second embodiment, the following effects are obtained in addition to the effects obtained with the first embodiment.

With the wireless access system 2 of the second embodiment, a value (Cp) is estimated (step S206) as the direct reception quality that will be obtained by a mobile apparatus 21 after a predetermined time interval has elapsed. The estimate is made based upon the position (displacement position Pa) expected to be reached by the mobile apparatus 21 when that interval has elapsed, and upon reception quality map data. If that estimated reception quality exceeds a predetermined threshold value, the No. 1 reception mode (direct reception of information from the fixed wireless station) is selected as the operating mode of the mobile apparatus 21. However if the estimated reception quality does not exceed that threshold value, then either the No. 1 reception mode or the No. 2 reception mode is selected. Specifically, if the direct reception quality (Cp) estimated to be obtained after the predetermined interval has elapsed does not exceed the direct reception quality (Ca) at the current time (i.e., at the current position of the mobile apparatus 21) by more than a predetermined amount, the No. 1 reception mode is entered or continued, for direct reception of information from the fixed wireless station 12. If Cp is judged to exceed Ca by at least the predetermined amount, the No. 2 reception mode is selected, i.e., reception of information from the fixed wireless station 12 is halted at least until the timer interval again elapses.

Thus with the second embodiment, a mobile apparatus 21 is prevented from direct reception of information from a fixed wireless station 12 when within an area of low reception quality, if it is estimated that the mobile apparatus 21 will enter an area of higher reception quality within a sufficiently short time. Otherwise, direct reception of information is continued while within the area of low reception quality. The average value of direct reception quality within the overall communication area of a fixed wireless station can thereby be effectively increased.

With the second embodiment as described above, a decision is made in step S207 as to the reception mode to be selected, based on comparing the direct reception quality with the displacement-location reception quality, as estimated in step S206. However it would be equally possible to make that decision of S209 based on the time that will be required to reach a communication area in which the reception quality is sufficiently high, e.g., exceeding a threshold value TH1.

With respect to the appended claims, the control section 115, in executing the processing of step S202 of FIG. 11 corresponds to a direct quality estimation circuit section, in executing the processing of step S206 and S207 the processing of steps S203 and S207 corresponds to a reception processing circuit section, and in executing the processing of step S206 corresponds to a destination position quality estimation circuit section.

3. Third Embodiment 3-1 Configuration

A third embodiment has a configuration basically similar to the first embodiment, and components corresponding to those of the first embodiment are assigned identical designations those of the first embodiment, with description of these omitted in the following.

Figure 12:
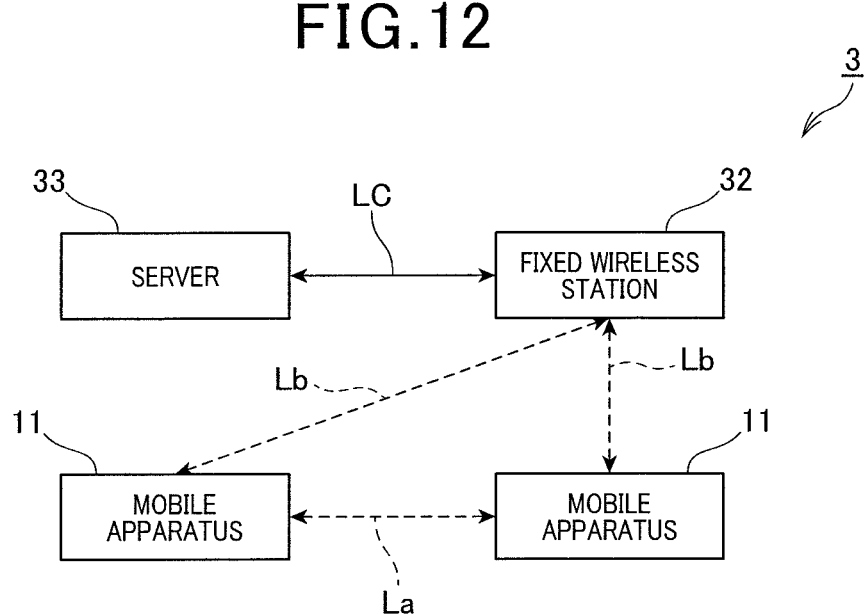
FIG. 12 is a block diagram showing the general configuration of a wireless access system according to a third embodiment.

FIG. 12 shows the basic configuration of a wireless access system 3 according to the third embodiment. In addition to a plurality of mobile apparatuses as for the wireless access system 1 of the first embodiment (FIG. 1) and a fixed wireless station 32, the wireless access system 3 further includes a server 33 which is connected for communication with the fixed wireless station 32 by a wireless or cable link Lc, with the communication being executed for example via the Internet. The configuration of each mobile apparatus 11 is as for the first embodiment (FIG. 2).

Figure 13:
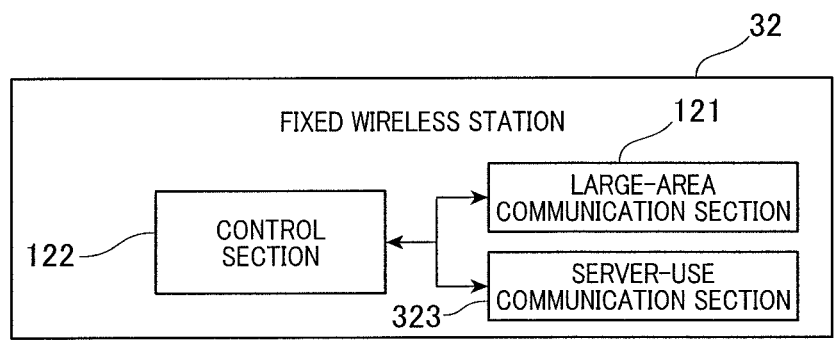
FIG. 13 is a block diagram showing the general configuration of a fixed wireless station of the third embodiment.

As shown in FIG. 13, in addition to the large-area communication section 121 and control section 122 as for the fixed wireless station 12 of the first embodiment (FIG. 3), the fixed wireless station 32 includes a server-use communication section 323 for communication with the server 33 (e.g., via the Internet).

Figure 14:
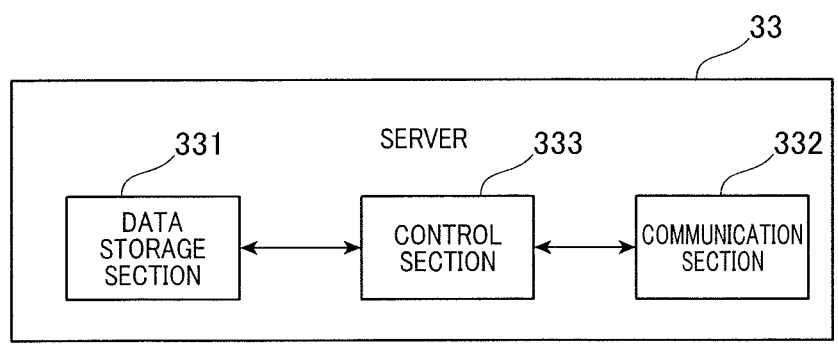
FIG. 14 is a block diagram showing the general configuration of a server of the third embodiment.

As shown in FIG. 14, the server 33 is made up of a data storage section 331, a control section 333 and a communication section 332. The data storage section 331 has data stored therein expressing one or more reception quality maps, which can be read out to the control section 333. The communication section 332 serves for communication with the fixed wireless station 32 via the link Lc, and includes a CPU ROM, RAM, etc., with the CPU executing processing in accordance with a program stored in the ROM, to perform overall control of the server 33. A single server 33 can be common to a plurality of fixed wireless stations 32, or (as in this example) can correspond to a single fixed wireless station 32. In the latter case, each server 33 may be configured as a part of the corresponding fixed wireless station 32.

3-2 General Features

The general features of the wireless access system 3 are as follows. Each mobile apparatus 11 transmits information, referred to in the following as probe information, to the server 33 via the fixed wireless station 32. The probe information includes an estimated (measured) value of direct reception quality, for direct reception of information from the fixed wireless station 32 at the current position of the mobile apparatus 11, and position information expressing that current position. The server 33 generates and updates reception quality maps based on the probe information thus sent from various mobile apparatuses.

The probe information sent by a mobile apparatus 11 further includes tag information, relating to factors which affect the reception sensitivity of that specific mobile apparatus. The tag information includes information expressing the vehicle type (of the host vehicle of the mobile apparatus 11) and the installation status and motion status of the mobile apparatus 11, etc.

The term "installation status" signifies the condition in which the mobile apparatus 11 is accommodated in its host vehicle. For example the mobile apparatus 11 may be installed as a built-in component, may be removably held in a cradle, may be carried by a vehicle occupant, etc. Hence the position (within the host vehicle) and inclination, etc., of the mobile apparatus 11 will vary depending upon its installation status, and the reception sensitivity of the mobile apparatus 11 will vary accordingly. Thus, even if a plurality of mobile apparatuses are of similar type and are positioned in areas of similar reception quality, their respective levels of reception sensitivity may differ depending upon their various installation statuses.

The "motion status" of a mobile apparatus 11 signifies its motion speed and motion direction. This is included in the tag information since, for example, the reception sensitivity tends to become decreased in accordance with increased motion speed. In addition, in the case of a mobile apparatus utilizing a directional antenna, the reception sensitivity will vary in accordance with the motion direction of the host vehicle.

When a mobile apparatus has low reception sensitivity as a result of its installation status etc., a value of direct reception quality that is measured by such a mobile apparatus will be lower than for a mobile apparatus having higher reception sensitivity. Hence if a reception quality map were to be generated based on a mixture of sets of probe information respectively transmitted from mobile apparatuses having various different levels of reception sensitivity, the reliability of the map information would be low. For that reason, with this embodiment, factors affecting the reception sensitivity of respective mobile apparatuses are considered when generating the reception quality maps. Specifically, before generating a reception quality map based on probe information obtained from various mobile apparatuses, the fixed wireless station 32 first categorizes the respective sets of reception quality/current position information received from the mobile apparatuses in accordance with the contents of the corresponding sets of tag information, and can thereby take into account the factors affecting reception sensitivity. This enables high accuracy and reliability to be achieved for the reception quality maps.

In addition, respectively different forms of reception quality map (i.e., covering the same communication area) are transmitted to the mobile apparatuses in accordance with the tag information received from them. Appropriate reception quality map data can thereby be transmitted to each mobile apparatus 11, in accordance with respectively different levels of reception sensitivity of the mobile apparatuses (i.e., as determined by the installation status and motion status of each mobile apparatus, as described above).

Figure 15:
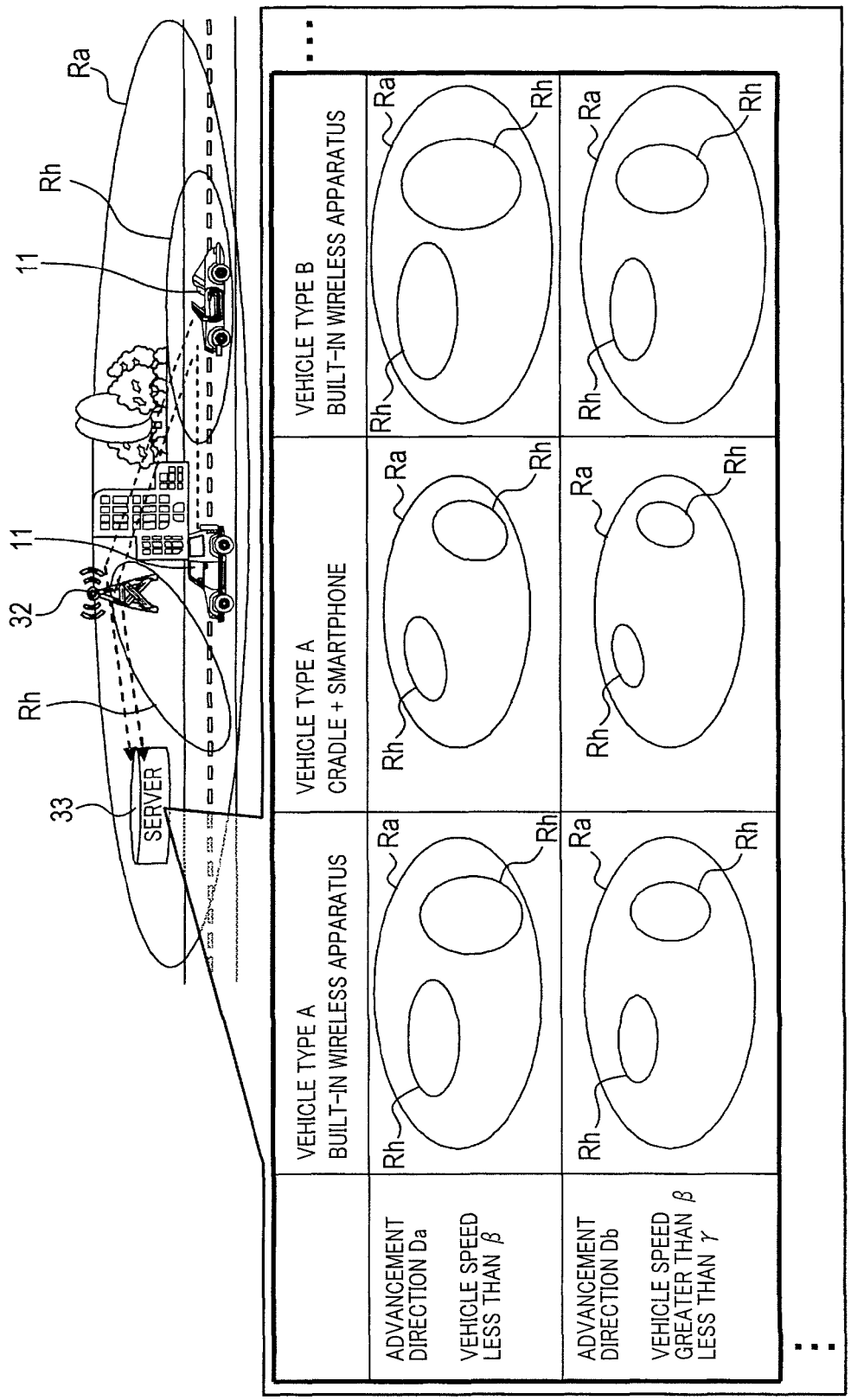
FIG. 15 is a diagram for use in describing reception quality maps which are generated with the third embodiment.

FIG. 15 conceptually illustrates how a plurality of different types of reception quality map are generated by the server 33 for use by respective mobile apparatuses, in accordance with the tag information of each mobile apparatus. To simplify the diagrams, the reception quality maps are shown as areas of differing direct reception quality indicated as discrete enclosed by isotonic lines. However in practice, reception quality/current position information, for use in generating the reception quality maps, can only be acquired by the server 33 from the mobile apparatuses with respect to regions which can actually be traversed by a vehicle (streets, highways, etc.). Hence, the reception quality maps can be advantageously generated such as to show only direct reception quality values within these specific regions.

3-3 Processing

Figure 16:
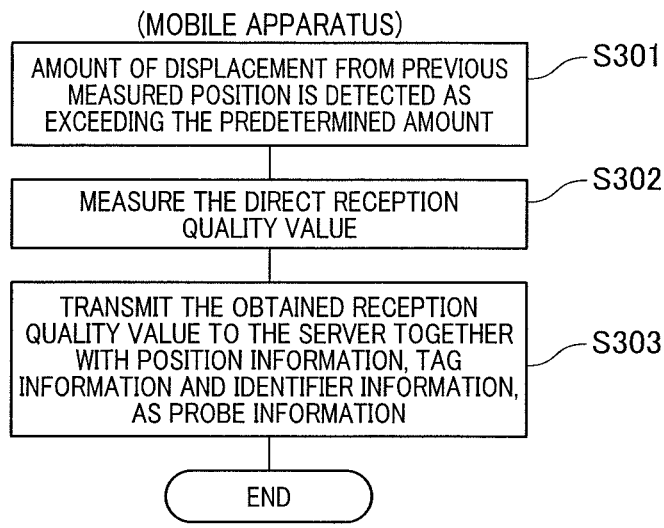

A specific example of processing executed by the control section 115 of a mobile apparatus 11 of this embodiment, other than the processing of FIG. 5 above, will be described referring to the flow diagram of FIG. 16. This is processing for transmitting probe information, which is commenced (step S301) each time the mobile apparatus 11 has traveled a predetermined distance. Specifically, each time the detected current position of the mobile apparatus 11 is updated, a decision is made as to whether the mobile apparatus 11 has moved by the predetermined distance from a previous position at which the processing of FIG. 5 was commenced, and if so, the processing is recommenced.

When the processing commences, the control section 115 of the mobile apparatus 11 first (step S302) measures the direct reception quality (i.e., direct reception quality index value). With this embodiment, the direct reception quality is measured based on the signal currently being received by the large-area communication section 114 of the mobile apparatus 11 from the fixed wireless station 32, e.g., received signal strength, signal/noise ratio, etc. However it would be equally possible to provide a sensor device, separate from the large-area communication section 114, for obtaining the direct reception quality.

Next (step S303) the control section 115 transmits probe information to the server 33 via the fixed wireless station 32. The probe information consists of the direct reception quality index value, position information expressing the current position of the mobile apparatus 11 (i.e., of its host vehicle), the above-described tag information, and self-identification information. The processing of FIG. 16 is then ended.

The processing whereby a mobile apparatus 11 transmits a request for reception quality map data to the server 33 will be described, referring to the flow diagram of FIG. 17. This processing is commenced (step S401) either when the mobile apparatus 11 has moved by more than a predetermined distance from the preceding position at which a reception quality map was received, or periodically (i.e., each time that a predetermined timer interval elapses).

When the processing is commenced, the control section 115 first judges (step S402) whether the direct reception quality at the current position of the mobile apparatus 11 exceeds a predetermined threshold value TH3. If TH3 is exceeded (YES decision) step S403 is then executed. In step S403, the control section 115 transmits a map request (request for reception quality map data to be transmitted) to the server 33 via the fixed wireless station 32, together with position information expressing the current position of the mobile apparatus 11, and self-identification information. The processing of FIG. 17 is then ended.

Figure 17:
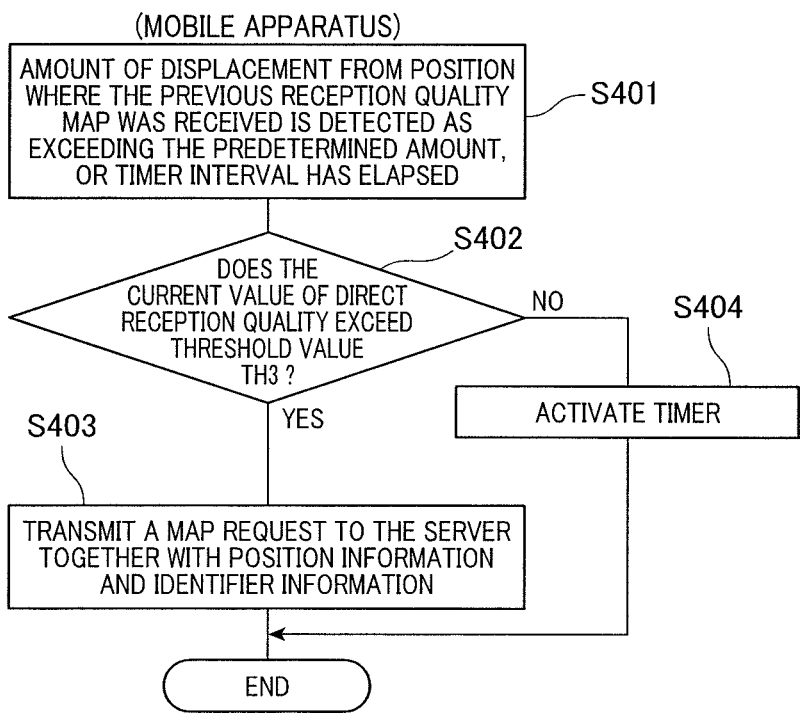

However if it is judged in step S402 that the threshold value TH3 is not exceeded (NO in step S402), the timer is restarted (step S404), and the processing of FIG. 17 is then ended. In that way, when the direct reception quality is excessively low, the mobile apparatus 11 waits until the reception quality becomes sufficiently high for enabling data of a reception quality map to be reliably received from the fixed wireless station 32.

The processing whereby a mobile apparatus 11 receives and processes updated reception quality map data will be described in the following, referring to the flow diagram of FIG. 18. This processing is commenced (step S501) when reception quality map data (more specifically, data expressing a partial reception quality map, covering only a region which contains or is adjacent to the current position of the mobile apparatus 11) are received from the server 33. The control section 115 then, based on the received data, updates the reception quality map data that are currently held stored in the data storage section 112 (step S502). The processing of FIG. 18 is then ended.

A specific example of processing executed by the control section 333 of the server 33 for updating a reception quality map will be described referring to the flow diagram of FIG. 19. This processing is commenced (step S601) when probe information is received from a mobile apparatus 11. Firstly, (step S601) the control section 333 selects a reception quality map (from among a plurality of types of reception quality map) in accordance with the tag information contained in the received probe information. Next (step S602), the control section 333 updates the selected map based on the received probe information, i.e., based on the reception quality information, current position information, etc., contained in the probe information (S603). The processing of FIG. 19 is then ended.

Figure 20:
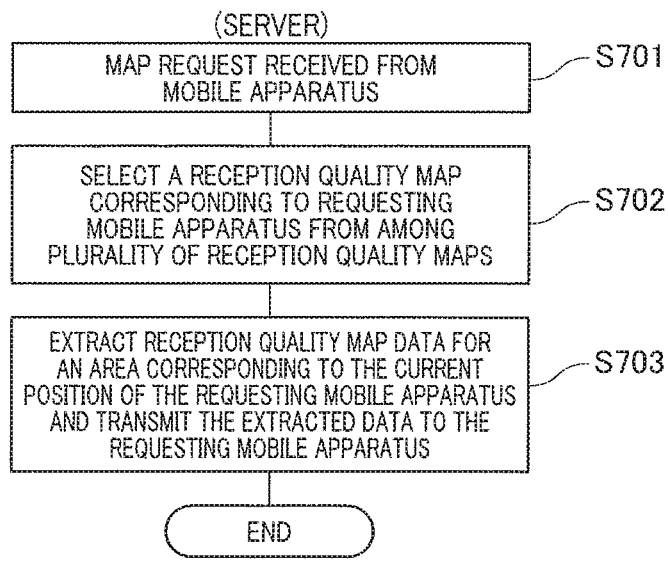

The processing whereby the server 33 transmits reception quality map data in response to a map request from a mobile apparatus 11 will be described referring to the flow diagram of FIG. 20. This processing is commenced (step S701) when a map request is received from a mobile apparatus 11. Firstly, the control section 333 specifies a reception quality map corresponding to (i.e., appropriate for) the mobile apparatus 11 which originated the map request, from among the plurality of types of reception quality maps. With this embodiment, the originating mobile apparatus 11 is identified by the control section 333 from the self-identification information sent with the map request. However it would be equally possible for the mobile apparatus 11 to transmit tag information together with the map request, and for the control section 333 to identify the originating mobile apparatus 11 based on the received tag information. Furthermore the system may operate whereby, if the control section 333 determines that there is no corresponding reception quality map currently available, a map which approximates to such a corresponding reception quality map is utilized.

Next, the control section 333 extracts reception quality map data for an area corresponding to (i.e., containing or adjacent to) the current position of the originating mobile apparatus 11, from the selected reception quality map, and transmits the extracted reception quality map data via the fixed wireless station 32 to the mobile apparatus 11 (step S703), for use in reception quality map updating which is executed by the mobile apparatus 11 as described above. The processing of FIG. 20 is then ended.

3-4 Effects

The third embodiment provides the following effects in addition to the effects obtained with the first embodiment.

3A With the third embodiment a server 33 can acquire respective sets of probe information from various mobile apparatuses. Each set of probe information includes position information relating a position at which information is received by the mobile apparatus 11 directly from the fixed wireless station 32 and the reception quality at that position, and tab information expressing various factors (such as the installation status of the mobile apparatus 11, etc.,) which can affect the reception sensitivity of the mobile apparatus 11 (step S601). The sets of probe information received from various mobile apparatuses are processed in accordance with the tag information contained in them, to generate reception quality maps. Specifically, the values of reception quality obtained from the mobile apparatuses are categorized in accordance with the tag information (specifically, in accordance with factors which affect reception sensitivity as described above).

Since the server 33 can generate reception quality maps based on currently obtained probe information sent from mobile apparatuses, up-to-date reception quality maps can be readily generated. Furthermore since factors affecting the various respective levels of reception sensitivity of the mobile apparatuses are taken into consideration, reception quality maps can be reliably generated even if there are large variations in the installation statuses, etc., of the mobile apparatuses whose transmitted information is used in generating the map data. Since the mobile apparatuses can thereby utilize reception quality map data which are reliably accurate and up-to-date, the average reception quality within the communication area of a fixed wireless station 32 is enhanced.

Furthermore, when a map request is received from a mobile apparatus 11 by the server 33, the server 33 provides data to the mobile apparatus 11 which express an extracted part of a selected reception quality map, with the extracted part corresponding to the current position of the requesting mobile apparatus 11, and with the reception quality map having been selected in accordance with factors (installation status, etc.,) affecting the reception sensitivity of the requesting mobile apparatus 11 (step S701-S703). Hence, appropriate reception quality map data can be provided to the respective mobile apparatuses.

With respect to the appended claims, the server 33 in executing the processing of step S601 of FIG. 19 corresponds to a quality information acquisition circuit section, in executing the processing of steps S602 and S603 corresponds to a map generating circuit section, in executing the processing of steps S701 to S703 corresponds to a map data provider circuit section, the probe information corresponds to position quality information, and the tag information corresponds to status information.

4. Fourth Embodiment

4-1 Configuration

In the following description of a fourth embodiment, which is basically similar to the first embodiment, components corresponding to those of the first embodiment are assigned identical designation symbols to those of the first embodiment, and detailed description of these is omitted.

Figure 21:
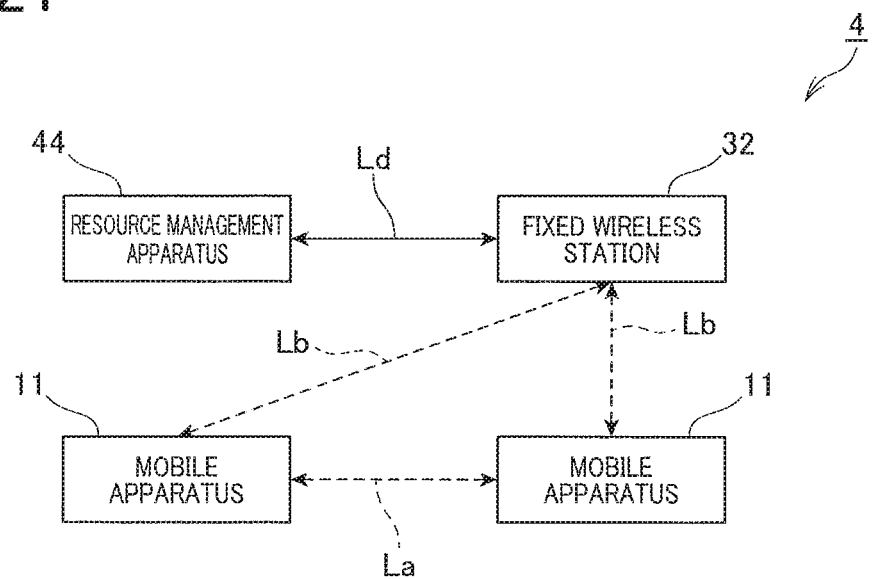
FIG. 21 is a block diagram showing the general configuration of a wireless access system according to a fourth embodiment.

FIG. 21 shows the basic configuration of a wireless access system 4 according to the fourth embodiment. In addition to a plurality of mobile apparatuses and a fixed wireless station 32 as for the wireless access system 1 of the first embodiment (FIG. 1), the wireless access system 4 further includes a resource management apparatus 44, connected for communication with the fixed wireless station 32 via a communication link Ld, (wireless or cable link). The configuration of a mobile apparatus 11 of this embodiment is similar to that of the first embodiment (FIG. 2), while the configuration of the fixed wireless station 32 is similar to that of the third embodiment (FIG. 13). However in the case of the fourth embodiment, the server-use communication section 323 of the fixed wireless station 32 communicates (e.g., using the Internet) with the resource management apparatus 44.

Figure 22:
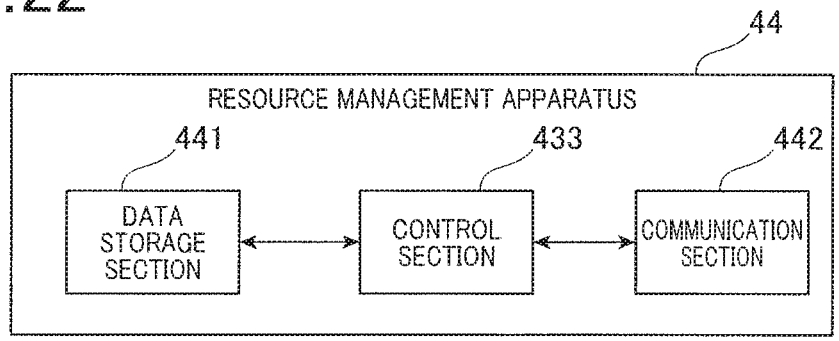
FIG. 22 is a block diagram showing the general configuration of a resource management apparatus of the fourth embodiment.

As shown in FIG. 22, the resource management apparatus 44 includes a communication section 441, a communication section 442 and a control section 443. The communication section 441 stores information concerning mobile apparatuses which currently are to be allocated communication resources and the amounts of resources to be allocated, as determined by processing executed by the control section 443 based on information transmitted from the fixed wireless station 32, Here, 'communication resources" allocated to a mobile apparatus 11 may for example be times (e.g., durations and/or number of time intervals allocated for transmitting information to the mobile apparatus 11) or frequencies used in wireless communication with the mobile apparatuses.

The communication section 442 communicates with the fixed wireless station 32 (e.g., using the Internet) via the communication link Ld. The control section 443 is formed of a CPU ROM, RAM, etc., with the CPU executing processing in accordance with a program stored in the ROM, to perform overall control of the constituent elements of resource management apparatus 44. A resource management apparatus 44 may be common to a plurality of fixed wireless stations 32, or each fixed wireless station 32 may be assigned a corresponding resource management apparatus 44. In the latter case, each resource management apparatus 44 can be constituted as part of the to corresponding fixed wireless station 32.

4-2 Elements

The essential features of processing executed by the wireless access system 4 of the fourth embodiment are as follows.

The resource management apparatus 44 allocates communication resources to those mobile apparatuses which currently are receiving information directly from the fixed wireless station 32, such mobile apparatuses being referred to in the following as "primary" mobile apparatuses for ease of description. Specifically, the resource management apparatus 44 allocates to each primary mobile apparatus 11 not only the communication resources required by that mobile apparatus 11 alone (i.e., for the purpose of receiving information required by that mobile apparatus 11), but also communication resources required by one or more mobile apparatuses (referred to in the following as "secondary" mobile apparatuses) which receive information relayed from the fixed wireless station 32 via that primary mobile apparatus 11.

Figure 23:
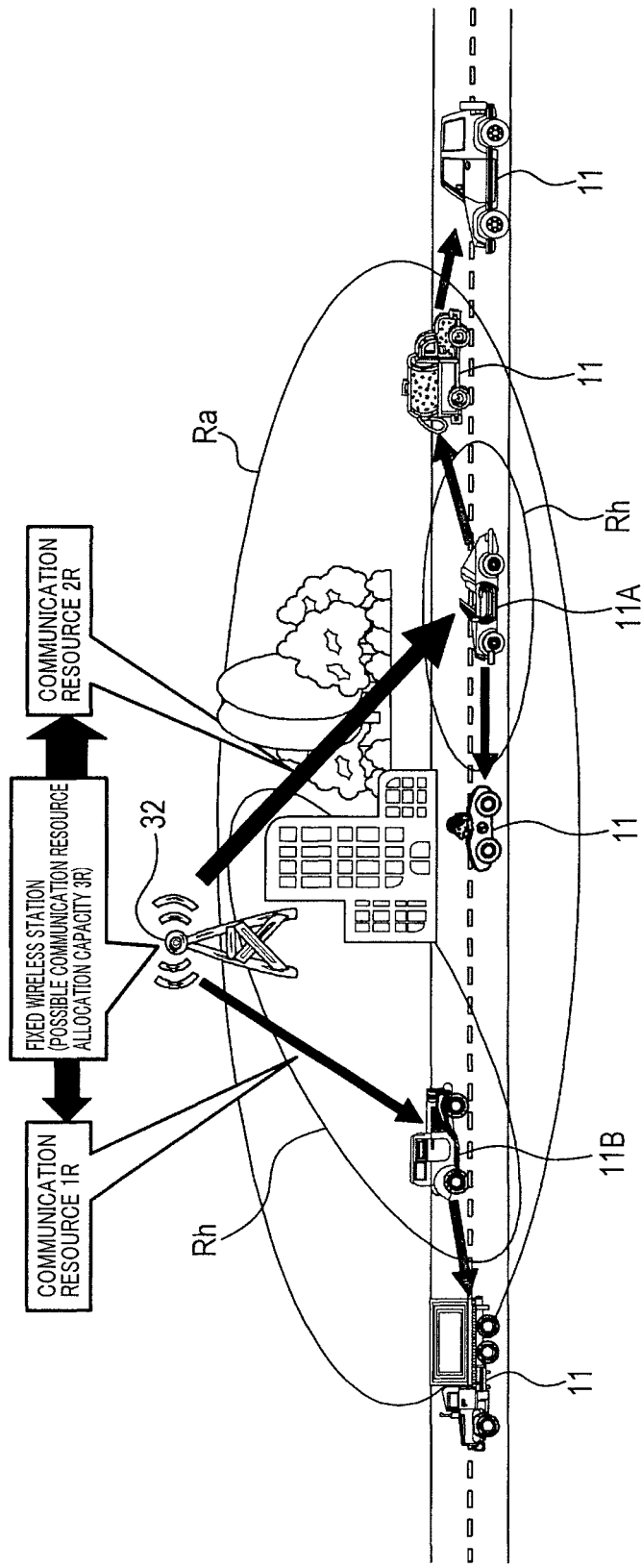
FIG. 23 is a conceptual diagram for illustrating a resource management method of the fourth embodiment.

For example, referring to the example of FIG. 23, a primary mobile apparatus 11A is relaying information to three secondary mobile apparatuses, and hence requires communication resources for a total of four mobile apparatuses. Similarly, a primary mobile apparatus 11B which is relaying information to a single secondary mobile apparatus 11 requires communication resources for a total of two mobile apparatuses. If the resources were to be allocated equally to the mobile apparatuses 11A and 11B, the overall result would be unequal allocation of the resources. With this embodiment, the resource management apparatus 44 manages the allocation of resources to each of the primary and secondary mobile apparatuses such that, when the resource management apparatus 44 receives a resource request from a primary mobile apparatus 11, it allocates the necessary communication resources as required based on the number of mobile apparatuses which are to receive information relayed via that primary mobile apparatus 11. Thus in the example of FIG. 23, the primary mobile apparatus 11A is allocated twice the amount of communication resources of the primary mobile apparatus 11B.

4-3 Processing

Specific examples of processing executed with this embodiment will be described referring first to the flow diagram of FIG. 24. This processing is executed separately from the processing of FIG. 5 described above.

Figure 24:
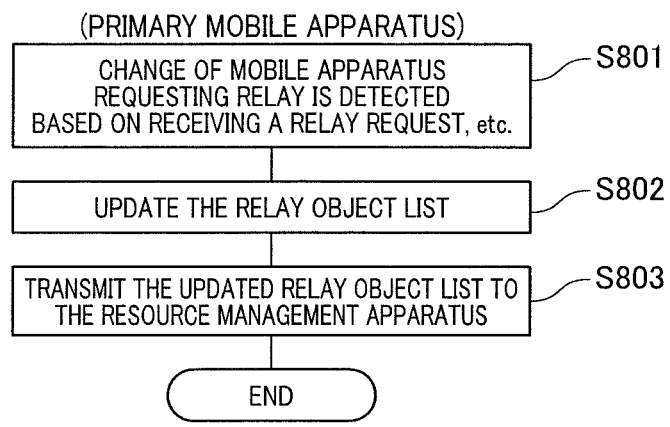
FIG. 24 is a flow diagram showing processing executed by a primary mobile apparatus of the fourth embodiment.

FIG. 24 shows an example of processing executed by a primary mobile apparatus for transmitting information to the resource management apparatus 44, concerning secondary mobile apparatuses which currently are receiving information relayed from the fixed wireless station 32 via that primary mobile apparatus 11. The processing of FIG. 24 is commenced (step S801) when a change is detected in the secondary mobile apparatus(es) that is/are to receive information relayed via that primary mobile apparatus, or when a relay request is first received from a secondary mobile apparatus by that primary mobile apparatus.

The control section 115 of the primary mobile apparatus 11 then updates a relay object list (step S802). This is a list of secondary mobile apparatuses which are requesting relaying of information via that primary mobile apparatus 11. The relay object list includes self-identification information for the primary mobile apparatus 11 and identification information for each of the requesting secondary mobile apparatuses. The control section 115 then transmits the updated relay object list via the fixed wireless station 32 to the resource management apparatus 44 (step S803), and the processing of FIG. 24 is ended.

Figure 25:
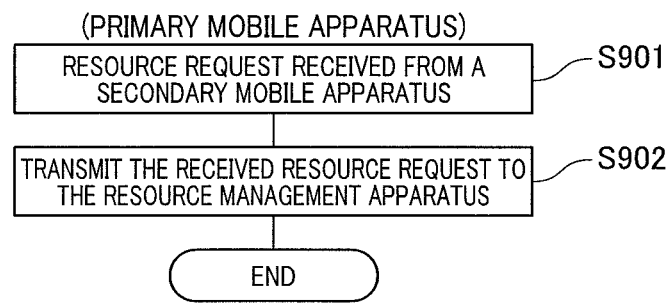
FIG. 25 is a flow diagram showing processing executed by a secondary mobile apparatus of the fourth embodiment.

The flow diagram of FIG. 25 illustrates processing executed by a primary mobile apparatus 11 when a resource request is received from a secondary mobile apparatus 11, for transmitting (i.e., relaying) that resource request to the resource management apparatus 44. A resource request is generated by a mobile apparatus 11 when it judges that its allocated communication resources are insufficient. The processing of FIG. 25 begins when a resource request is received from a secondary mobile apparatus 11 (step S901). The primary mobile apparatus 11 then transmits the resource request to the resource management apparatus 44 via the fixed wireless station 32 (step S902), and the processing of FIG. 25 is then ended. Although not shown in the drawings, when necessary, a resource request may be issued (originated) by a primary mobile apparatus 11 (e.g., when there are insufficient resources allocated for receiving information which that mobile apparatus itself requires) and transmitted to the resource management apparatus 44 via the fixed wireless station 32.

A specific example of processing executed by the control section 443 of the resource management apparatus 44 of this embodiment will be described referring to the flow diagram of FIG. 26. The processing is commenced (step S1001) when a relay object list is received from a primary mobile apparatus 11. The control section 443 then updates a resource allocation object list (i.e., a list of mobile apparatuses to which communication resources are currently allocated) to include all of the mobile apparatuses specified in the currently-received relay object list (step S1002). The processing of FIG. 26 then ends.

Next, processing executed by the resource management apparatus 44 to allocate communication resources in accordance with a resource request from a mobile apparatus 11 will be described, referring to the flow diagram of FIG. 27. This processing is commenced when a resource request is received from a mobile apparatus 11 (step S1101). The control section 443 of the resource management apparatus 44 then determines the amount of communication resources that will be allocated to that mobile apparatus 11, based on the overall resource utilization condition, the total number of mobile apparatuses that currently are allocated communication resources, etc., (step S1102). The processing of FIG. 27 then ends.

4-4 Effects

The following effects are obtained with the fourth embodiment described above.

4A The resource management apparatus 44 acquires identification information etc., concerning each secondary mobile apparatus 11 which receives information from the fixed wireless station 32 via a primary mobile apparatus 11 (step S1001). The resource management apparatus 44 determines the communication resources to be allocated to that primary mobile apparatus 11, taking into consideration the total number of secondary mobile apparatuses which currently require to receive information from the fixed wireless station 32 relayed via that primary mobile apparatus 11 (steps S1002, S1102). Hence, more appropriate resource allocation can be achieved than for the case in which the resource allocation amount(s) are determined based only on the primary mobile apparatuses, without considering the communication resources required by the secondary mobile apparatuses. As a result, the average reception quality within the communication area of the fixed wireless station 32 can be further enhanced.

Figure 26:
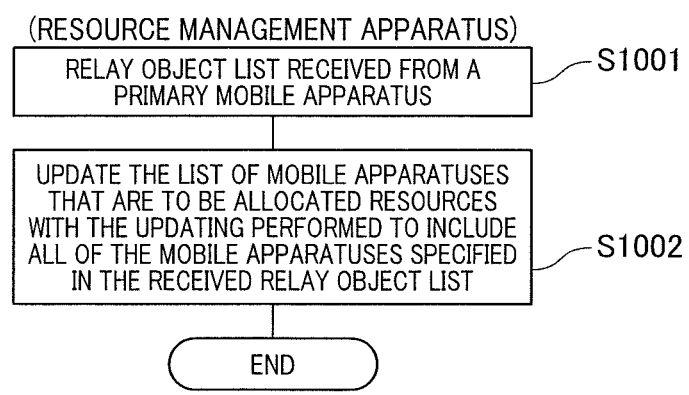
FIG. 26 is a flow diagram showing primary processing executed by a resource management apparatus of the fourth embodiment.

With respect to the appended claims, the resource management apparatus 44 in executing the processing of step S1001 of FIG. 26 corresponds to a relay information acquisition circuit section, and in executing the processing of step S1102 corresponds to an allocation determining circuit section.

5. Fifth Embodiment 5-1 Configuration

In the following description of a fifth embodiment, which is basically similar to the third embodiment, components corresponding to those of the third embodiment are assigned identical designation symbols to those of the third embodiment, and detailed description is omitted.

FIG. 28 shows the basic configuration of a wireless access system 5 according to the fifth embodiment, which includes a plurality of mobile apparatuses (three of these indicated as 11a, 11b, 11c respectively) and a fixed wireless station 32 and server 33 as for the wireless access system 3 of the third embodiment (FIG. 12). However the wireless access system 5 contains a plurality of fixed wireless stations 32 (in this example, two fixed wireless stations 32a and 32b), which operate with a single server 33 in common. Each fixed wireless station 32 can communicate with the server 33 via a corresponding communication link Lc (wireless or cable link). The configuration of each mobile apparatus 11 is as for the first embodiment (FIG. 2) and the configurations of the server 33 and of each of the fixed wireless stations 32 are as for the third embodiment (FIGS. 13, 14).

5-2 Features

The general features of processing executed by the wireless access system 5 of the fifth embodiment are described in the following.

With the wireless access system 5, as illustrated by FIGS. 29A, 29B, an interference area Ri (i.e., an area in which interference occurs between respective communication resources of a plurality of fixed wireless stations) is formed in a region of overlap between respective communication areas Ra of the fixed wireless stations 32a and 32b. A decision as to whether communication resources are to be allocated exclusively (as defined hereinafter) by the fixed wireless stations 32a, 32b is made based upon the conditions of all of the mobile apparatuses which are in communication with either of the fixed wireless stations 32a, 32b. Here, "communication resource" has the general significance described above for the fourth embodiment, i.e., frequency or time resources. "Exclusive allocation of communication resources" signifies that, for example, respectively different frequencies or respectively different time intervals must be allocated for use in transmitting information (by the fixed wireless stations corresponding to the interference area) to the various mobile apparatuses. That is, when such exclusive allocation is performed in the case of the example of FIGS. 29A, 29B, if a communication resource is being used for transmitting information by the fixed wireless station 32a, that communication resource is excluded from such use by the fixed wireless stations 32b. If such exclusive allocation of communication resources is not performed when a mobile apparatus 11 is within an interference area Ri, that mobile apparatus becomes unable to receive information from any fixed wireless station 32 corresponding to the interference area, due to communication resource interference.

However when such exclusive allocation is applied, it is inevitable that the amounts of communication resources available for transmitting information to communication areas outside the interference area Ri will become greatly reduced.

FIG. 29A illustrates a case in which two mobile apparatuses are positioned within an interference area Ri, receiving information from fixed wireless stations 32a, 32b by direct reception. In this case, each fixed wireless station 32a, 32b can judge that it must apply exclusive allocation of communication resources, i.e., can judge that at least one mobile apparatus within the interference area Ri is receiving information directly from a fixed wireless station.

FIG. 29B illustrates a case in which exclusive allocation of communication resources is avoided, with this embodiment. A mobile apparatus 11b is positioned within the interference area Ri formed by the fixed wireless stations 32a, 32b, and is receiving information from the fixed wireless station 32a by relay communication via the mobile apparatus 11a, which is within a high reception quality communication area Rh of the fixed wireless station 32a (outside the interference area Ri). Similarly, a mobile apparatus 11c is positioned within the interference area Ri and is receiving information from the fixed wireless station 32b by relay communication via the mobile apparatus 11d, which is within a high-quality communication area Rh of the fixed wireless station 32b. In that case, exclusive allocation of communication resources is unnecessary, since identical resources can be used concurrently by the fixed wireless stations 32a, 32b to transmit information to the mobile apparatuses 11b, 11c in the interference area Ri without interference. However each fixed wireless station 32a, 32b cannot judge that exclusive allocation of communication resources is unnecessary.

For simplicity of illustration, it is assumed in FIGS. 29A, 29B that the communication resources available for use by a fixed wireless station become reduced by half (from 2R to R) when exclusive allocation of communication resources is applied.

FIG. 29C illustrates a case in which only one of the pair of fixed wireless stations 32a, 32b is communicating directly with a mobile apparatus (11c) within the interference area Ri, while the other fixed wireless station 32a is communicating indirectly with the mobile apparatus 11b within the area Ri.

In the following, the designation "type-A fixed wireless station" will be applied to a fixed wireless station which is currently in a condition whereby no mobile apparatus is within the corresponding interference area and receiving information directly from the fixed wireless station, such as the fixed wireless stations 32a and 32b in FIG. 29B. The designation "type-B fixed wireless station" will be applied to a fixed wireless station which is in a condition whereby at least one mobile apparatus is within the corresponding interference area and is receiving information directly from the fixed wireless station, such as the fixed wireless stations 32a and 32b in FIG. 29A. A type-B fixed wireless station can, by itself, judge whether or not it is currently required to apply exclusive allocation of communication resources, while a type-A fixed wireless station cannot.

Hence with this embodiment the server 33 basically judges, for each corresponding fixed wireless station, whether or not exclusive allocation of communication resources is currently required to be applied by that wireless station. The judgement results are transmitted to each fixed wireless station which is currently in the type-A condition.

Figure 30:
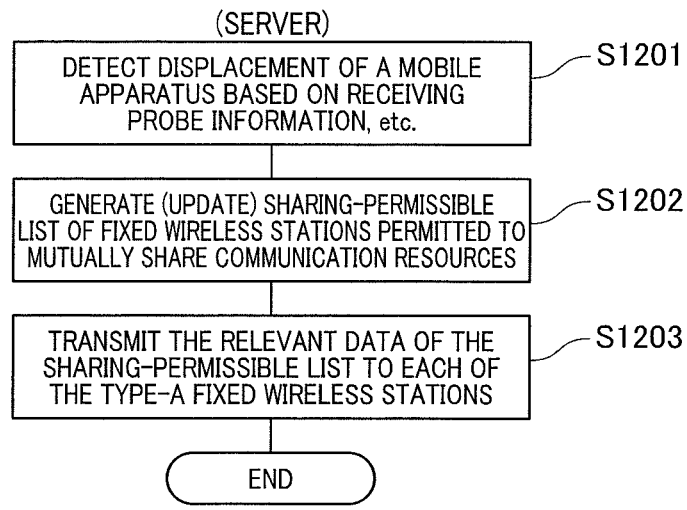
FIG. 30 is a flow diagram showing processing executed by a server of the fifth embodiment.

A specific example of processing executed by the control section 333 of the server 33 (executed separately from the processing of FIGS. 19-20 above) will be described referring to the flow diagram of FIG. 30. The processing of FIG. 30 is commenced (step S1201) each time that displacement of a mobile apparatus 11 is detected, based on received probe information, etc.

Firstly (step S1202), the control section 333 generates (updates) a list, referred to in the following as a sharing-permissible list. This identifies each type-A fixed wireless station together with relevant list data (including information specifying each of the other fixed wireless stations for which resource sharing with that fixed wireless station is currently permitted).

Next (step S1203) the control section 333 transmits, to each type-A fixed wireless station, the relevant part of the sharing-permissible list data.

This embodiment may be configured to incorporate one or more resource management apparatuses, as described for the fourth embodiment. In that case, the sharing-permissible list data relating to a fixed wireless station may be transmitted directly to the corresponding resource management apparatus (i.e., which controls resource allocation for that fixed wireless station).

An example of processing executed by the control section 122 of a fixed wireless station 32 of this embodiment each time that updated sharing-permissible list data are received will be described referring to the flow diagram of FIG. 31. The processing commences (step S1301) when the relevant part of the sharing-permissible list data are received from the server 33. Firstly (step S1302), the control section 122 extracts a wireless station list from the received sharing-permissible data. The wireless station list is a list of the other fixed wireless stations with which the recipient fixed wireless station is currently permitted to share communication resources.

Next (step S1303), based on the wireless station list, the recipient fixed wireless station commences (or continues) use of those communication resources which can be shared with the other fixed wireless stations specified in the wireless station list, and halts the sharing of communication resources with any fixed wireless station that is not identified in the wireless station list.

Figure 31:
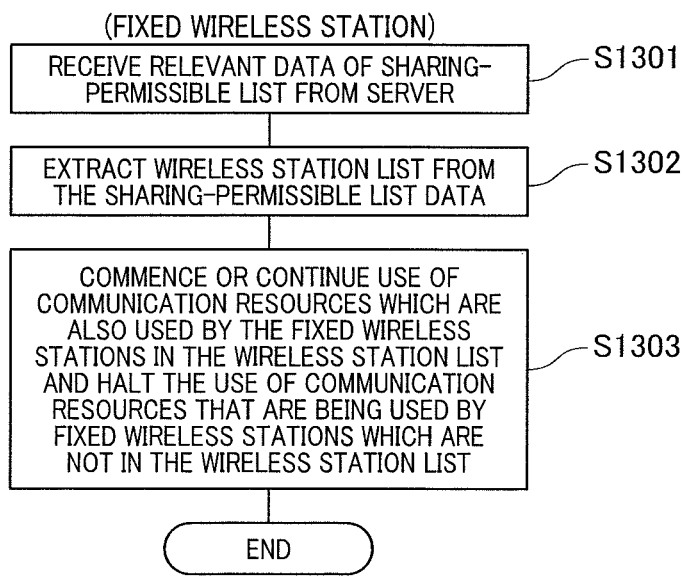
FIG. 31 is a flow diagram showing processing executed by a fixed wireless station of the fifth embodiment.

The processing of FIG. 31 is then ended.

5-3 Effects

The fifth embodiment described above provides similar effects to those of the third embodiment, together with the following effects.

5A With the fifth embodiment, even if there are one or more mobile apparatuses within an interference area Ri, occurrence of resource interference within the interference area Ri is permitted on condition that information can be relayed from fixed wireless stations 32 to the mobile apparatuses within the interference area Ri, via respective mobile apparatuses which are located outside the interference area Ri. Thus by providing occasions when resource interference is permitted within such an interference area Ri, opportunities for sharing identical communication resources by a plurality of fixed wireless stations 32 become increased.

Communication resources can thereby be utilized more efficiently than with the prior art, in which resource interference within an interference area must always be prevented when any mobile apparatus is within that interference area and requires to receive information from a fixed wireless station. Hence the fifth embodiment enables an improvement in the average reception quality within the respective communication areas of fixed wireless stations which form an interference area.

With respect to the appended claims, the server 33 in executing the processing of steps S1201 and S1202 corresponds to a receiving apparatus judgement circuit section, and in executing the processing of step S1203 corresponds to an allocation command circuit section.

6 Sixth Embodiment 6-1 Configuration

In the following description of a sixth embodiment, which is basically similar to the first embodiment, components corresponding to those of the first embodiment are assigned identical designations to those of the first embodiment, and detailed description of these is omitted.

Figure 32:
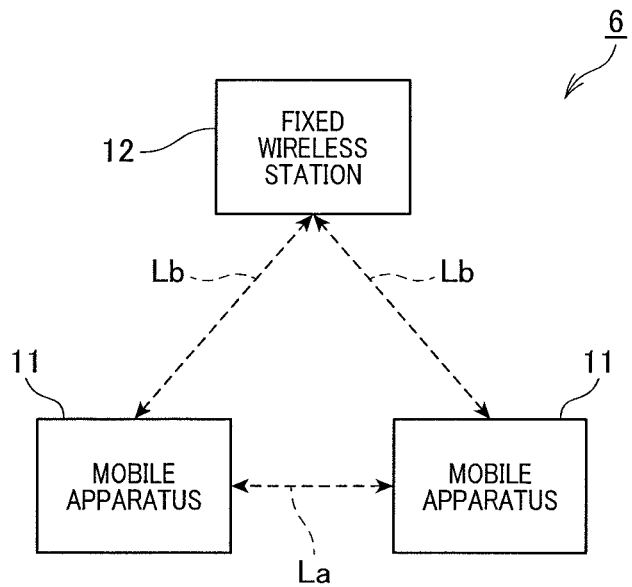
FIG. 32 is a block diagram showing the general configuration of a wireless access system according to a sixth embodiment.

FIG. 32 shows the basic features of a wireless access system 6 according to the sixth embodiment. As for the first embodiment, this consists of a fixed wireless station 12 and a plurality of mobile apparatuses. The mobile apparatuses 61 of this embodiment are transported in respective vehicles, each vehicle having an automatic driving capability, i.e., whereby the vehicle functions determining motion and direction (acceleration, braking, steering) are automatically controlled. The configuration of the fixed wireless station 12 is as for the first embodiment (FIG. 3).

Figure 33:
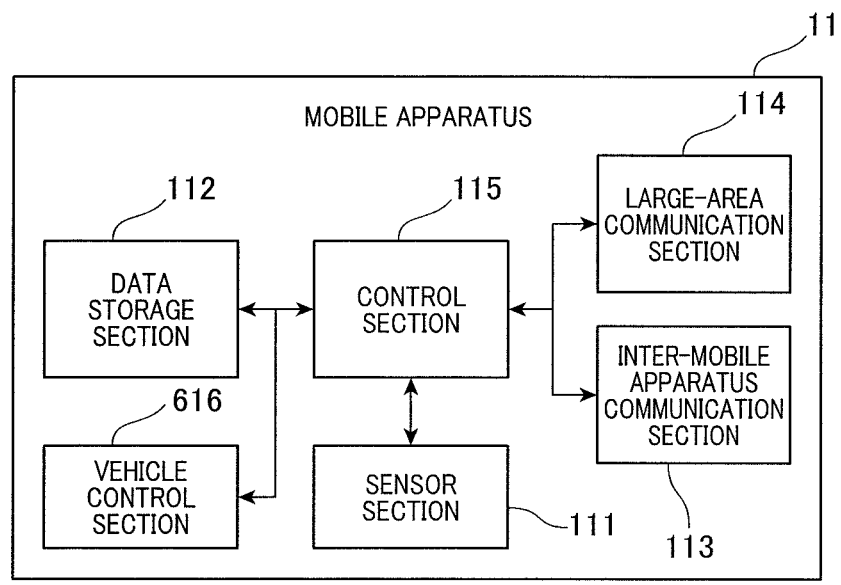
FIG. 33 is a block diagram showing the general configuration of a mobile apparatus of the sixth embodiment.

As shown in FIG. 33, in addition to a sensor section 111, a data storage section 112, an inter-mobile apparatus communication section 113, a large-area communication section 114, and a control section 115, each mobile apparatus 61 incorporates a vehicle control section 616 which executes the automatic driving control.

6-2 Features

The general features of processing executed by the wireless access system 6 are described in the following.

Essentially, the displacement of each mobile apparatus is controlled to ensure as far as possible, i.e., without adversely affecting other road traffic, that at least a specific number (but no more than that number) of mobile apparatuses 61 is within each area of high direct reception quality at any point in time. The opportunities for relaying information from a fixed wireless station via such mobile apparatuses located in respective areas of high reception quality can thereby be increased.

An example will be described for the case in which the predetermined number is 1, referring to FIGS. 34A~34C. In these diagrams, traffic light SN are within an area of low direct reception quality, while an area RH1 of high direct reception quality is positioned some distance before the traffic lights SN, Here "high direct reception quality" signifies a direct reception quality index exceeding a predetermined threshold value, while in a "low direct reception quality" area, the threshold value is not exceeded.

FIG. 34A: A mobile apparatus 61A is within the area Rh1, and judges that there is no other mobile apparatus within that area Rh1. More specifically, it judges (based on received position information from other mobile apparatuses) that there is no other mobile apparatus which is within a predetermined distance from the mobile apparatus 61A and which has a direct reception quality value exceeding the threshold value. Hence (since the total number of mobile apparatuses with in the area Rh1 is 1) the host vehicle of mobile apparatus 61 is halted. At that time a mobile apparatus 61B is advancing towards the area Rh1, while receiving information relayed from the fixed wireless station 12 via the mobile apparatus 61A. The mobile apparatus 61B judges that it is not currently within an area of high direct reception quality, and so continues to advance.

FIG. 34B: The mobile apparatus 61B enters the area Rh1, while transmitting its position information to the mobile apparatus 61A. The mobile apparatus 61A thereby judges that there is now more than 1 mobile apparatus within the high direct reception quality area Rh1. The host vehicle of mobile apparatus 61A thereby becomes controlled to commence normal driving operation, and so advances towards the traffic lights SN.

FIG. 34C: the mobile apparatus 61B now judges that there is no more than 1 mobile apparatus within the high reception quality area Rh1, and hence becomes halted. The mobile apparatus 61A becomes halted at the traffic lights SN (assumed to be in the red condition), in the area of low direct reception quality. However the mobile apparatus 61A now receives information relayed from the fixed wireless station 12 via the mobile apparatus 61B.

A specific example of processing which is repetitively executed by the control section 115 of a mobile apparatus 61 (referred to in the following as the local mobile apparatus) of this embodiment, executed separately from the processing of FIG. 5, will be described referring to the flow diagram of FIG. 35.

The processing of FIG. 35 is commenced (step S1401) when position information is received by the local mobile apparatus through small-area wireless communication from another mobile apparatus X, indicating the current position of the other mobile apparatus X.

The control section 115 then (step S1402) estimates the direct reception quality attainable at the position of the other mobile apparatus X. This estimate is made based on the current position of the mobile apparatus X and on reception quality map data that have been acquired beforehand (as described for the first embodiment) and are read out from the data storage section 112 of the local mobile apparatus.

Respective position information may be similarly received by the local mobile apparatus from a plurality of such other mobile apparatuses, with corresponding values of direct reception quality for these other mobile apparatuses being similarly estimated as described above.

Next (step S1403) the control section 115 judges whether a condition exists whereby the local mobile apparatus currently is in a position having a high direct reception quality above a threshold value TH1, while at least a predetermined maximum number of other mobile apparatuses, each having a direct reception quality value exceeding TH1 are each within a predetermined distance from the local mobile apparatus. If that condition is satisfied (YES decision), the vehicle control section 616 of the local mobile apparatus is notified to commence or continue normal driving control and the processed if FIG. 35 is ended (step S1405). However if a NO decision is reached in step S1403, step S1404 is executed. In that case, the vehicle control section 616 is notified to apply control for displacing the host vehicle until the control section 115 judges that an area is entered in which the direct reception quality exceeds TH1, with the vehicle then being halted. The processing of FIG. 35 is then ended.

6-3 Effects

The sixth embodiment described above provides similar effects to those of the third embodiment, together with the following effects.

With the sixth embodiment, when a mobile apparatus (the local mobile apparatus) is positioned in an area of low reception quality, the mobile apparatus judges whether there are more than a predetermined number of other mobile apparatuses, each capable of relaying information from the fixed wireless station 12, located within a specific area that is centered on the current position of the local mobile apparatus 61 (step S1403). If it is judged that there is not more than the predetermined number of such other mobile apparatuses 61, then the host vehicle of the local mobile apparatus 61 is controlled to become displaced from its current position (step S1404). In that way, positioning of mobile apparatuses 61 within areas of low reception quality can be reduced.

With respect to the appended claims, the control section 115 in executing the processing of step S1402 of FIG. 35 corresponds to a reception quality estimation circuit section, and in executing the processing of step S1403 corresponds to an other-apparatus judgement circuit section. The vehicle control section 616 of FIG. 33, in conjunction with the control section 115 in executing the processing of step S1404, corresponds to a vehicle control circuit section.

Other Embodiments

The present invention is not limited to the embodiments described above, and various other embodiments may be envisaged.

For example, at least a part of the processing executed by a mobile apparatus (11, 21, 61) could be executed by a fixed wireless station (12, 32), or by a server 33, a resource management apparatus 44, or other apparatus. For example, a fixed wireless station (12, 32) could be configured such as to acquire the current positions of the mobile apparatuses (11, 21, 61) and to estimate the reception quality values at these current positions, based on a reception quality map. Similarly, at least a part of the processing executed by the above apparatuses other than the mobile apparatuses could be executed by another apparatus.

Furthermore it is not essential that the reception quality maps are stored in a data storage section 112. Instead, these could be acquired by the mobile apparatuses from an external apparatus (for example a server 33).

Moreover, functions of a single constituent element of the above embodiments could be dispersed among a plurality of constituent elements, or the function of a plurality of constituent elements could be executed in combination by a single constituent element. Furthermore, at least a part of the configuration of each of the above embodiments could be replaced by a known type of apparatus which performs an identical function. Moreover, it would be possible to omit parts of the above embodiments, so long as the problems overcome by the present invention are effectively overcome. Furthermore it would be possible to add at least a part of each of the above embodiments to another one of the embodiments, or to replace a part of an embodiment by a part of another one of the embodiments.

Although the above embodiments have been described with respect to mobile apparatuses which are transported in vehicles, it will be understood that (other than for the features of the sixth embodiment) the invention would be equally applicable to mobile apparatuses which are carried by persons, such as mobile telephones, etc.

What is claimed is:

1. A mobile communication apparatus, comprising:
   a position detection circuit section configured for detecting a current position of the mobile communication apparatus;
   a map acquisition circuit section configured for acquiring a reception quality map expressing a relationship between reception positions at which information can be directly received from a fixed wireless station located at a fixed terrestrial position and direct reception quality index values respectively corresponding to the reception positions, each direct reception quality index value expressing a reception quality obtainable when information is directly received from the fixed wireless station at the corresponding reception position;
   a direct reception quality estimation circuit section configured for estimating a direct reception quality index value corresponding to the current position of the mobile communication apparatus, the estimation being based upon the acquired reception quality map and the detected current position of the mobile communication apparatus;
   a reception processing circuit section configured for selecting one of a first reception mode and a second reception mode, the first reception mode being an operating mode in which information is received directly from said fixed wireless station and the second reception mode being an operating mode in which a limitation is placed upon receiving the information directly from said fixed wireless station;
   a position acquisition circuit section configured for acquiring a current position of a candidate relay apparatus constituted by another mobile communication apparatus, and
   a relay quality estimation circuit section configured for estimating a relay reception quality index value expressing a reception quality obtained when information is relayed from the fixed wireless station via the candidate relay apparatus, the estimation being performed based upon the acquired current position of the candidate relay apparatus and the acquired reception quality map;
   wherein the reception processing circuit section:
   selects the first reception mode as the operation mode, when the direct reception quality index value exceeds a predetermined threshold value;
   when the direct reception quality index value does not exceed the predetermined threshold value, selects one of the first reception mode and the second reception mode as the operation mode, the selection being based upon comparing the relay reception quality index value with the direct reception quality index value; and
   when the second reception mode is selected, effects reception of information from the fixed wireless station via the candidate relay apparatus.

2. The mobile communication apparatus as claimed in claim 1 wherein the mobile communication apparatus is transported in a corresponding vehicle, further comprising:
   an other-apparatus judgement circuit section configured for judging when a number of candidate relay apparatuses respectively positioned within a specific area centered on the current position of the mobile communication apparatus, exceeds a predetermined number, each of the candidate relay apparatuses having a relay reception quality exceeding the predetermined threshold value, and
   a vehicle control circuit section configured for controlling motion of the corresponding vehicle;
   wherein the vehicle control circuit section operates to move the mobile communication apparatus to a position at which the direct reception quality index value estimated by the direct reception quality estimation circuit section exceeds the predetermined threshold value, when it is judged by the other-apparatus judgement circuit section that the number of candidate relay apparatuses does not exceed the predetermined number.

3. The mobile communication apparatus according to claim 1, wherein the reception processing circuit section is configured to derive a small-area reception quality index expressing a reception quality with respect to communication between the mobile communication apparatus and the candidate relay apparatus, and to inhibit selection of the second reception mode when the small-area reception quality index does not exceed a predetermined threshold value.

4. A mobile communication apparatus comprising
   a position detection circuit section configured for detecting a current position of the mobile communication apparatus;
   a map acquisition circuit section configured for acquiring a reception quality map expressing a relationship between reception positions at which information can be directly received from a fixed wireless station located at a fixed terrestrial position and direct reception quality index values respectively corresponding to the reception positions, each direct reception quality index value expressing a reception quality obtainable when information is directly received from the fixed wireless station at the corresponding reception position;

a direct reception quality estimation circuit section configured for estimating a direct reception quality index value corresponding to direct reception of information from the fixed wireless station at the current position of the mobile communication apparatus, the estimation being based upon the acquired reception quality map and the detected current position of the mobile communication apparatus;

a reception processing circuit section configured for selecting one of a first reception mode and a second reception mode, the first reception mode being an operating mode in which information is received directly from the fixed wireless station; and a displacement-location quality estimation circuit section configured for estimating a destination position expected to be reached by the mobile communication apparatus after a predetermined time interval has elapsed, and for estimating a displacement-location reception quality index value corresponding to direct reception of information from the fixed wireless station at the destination position, the estimation of the displacement-location reception quality index value being based upon the estimated destination position and the acquired reception quality map;

wherein when the direct reception quality index value exceeds a predetermined threshold value, the reception processing circuit section selects the first reception mode as the operation mode and thereby initiates or continues direct reception of information from the fixed wireless station, and when the direct reception quality index value does not exceed the threshold value, the reception processing circuit section:

compares the direct reception quality index value with a destination reception quality index value, and selects the first reception mode as the operation mode, when the displacement-location reception quality index value does not exceed the direct reception quality index value, and selects the second reception mode as the operation mode when the displacement-location reception quality index value exceeds the direct reception quality index value, the second reception mode being a mode in which direct reception of information from the fixed wireless station is postponed.

5. A wireless access system comprising a fixed wireless station located at a fixed terrestrial position and a plurality of mobile communication apparatuses, the mobile communication apparatuses being each operable in a condition of being transported and capable of receiving information transmitted from the fixed wireless station, each of the mobile communication apparatuses comprising:

a position detection circuit section configured for detecting a current position of the mobile communication apparatus;

a map acquisition circuit section configured for acquiring a reception quality map expressing a relationship between reception positions at which information can be directly received from the fixed wireless station and values of a reception quality index respectively corresponding to the reception positions;

a direct quality estimation circuit section configured for estimating the reception quality index value corresponding to direct reception of information from the fixed wireless station at the current position of the mobile communication apparatus, the estimation being based upon the acquired reception quality map and the current position detected by the position detection circuit section;

a reception processing circuit section configured for selecting one of a first reception mode and a second reception mode as an operating mode, the selection executed based upon the reception quality index value estimated by the direct quality estimation circuit section, the first reception mode being an operating mode in which information is received directly from said fixed wireless station, the second reception mode being an operating mode in which a limitation is placed upon receiving information directly from said fixed wireless station;

a position acquisition circuit section configured for acquiring a current position of a candidate relay apparatus constituted by another mobile communication apparatus, and a relay quality estimation circuit section configured for estimating a relay reception quality index value expressing a reception quality obtained when information is relayed from the fixed wireless station via the candidate relay apparatus, the estimation being performed based upon the acquired current position of the candidate relay apparatus and the acquired reception quality map;

wherein the reception processing circuit section:

selects the first reception mode as the operation mode, when the direct reception quality index value exceeds a predetermined threshold value;

when the direct reception quality index value does not exceed the predetermined threshold value, selects one of the first reception mode and the second reception mode as the operation mode, the selection being based upon comparing the relay reception quality index value with the direct reception quality index value; and when the second reception mode is selected, effects reception of information from the fixed wireless station via the candidate relay apparatus.

6. The wireless access system as claimed in claim 5, comprising a plurality of mobile communication apparatuses transported by respective vehicles and receiving information directly from the fixed wireless station, and further comprising:

a quality information acquisition circuit section configured for receiving respective sets of position quality information and status information from the mobile communication apparatuses, each set of position quality information expressing a relationship between positions at which information has been received directly from the fixed wireless station by a mobile communication apparatus and corresponding values of a reception quality index, the status information expressing a condition in which the mobile communication apparatus is installed in the corresponding vehicle; and a map generating circuit section configured for generating reception quality maps based on the received sets of position quality information and status information.

7. The wireless access system as claimed in claim 6, wherein the map generating circuit section categorizes the generated reception quality maps in accordance with the status information utilized in generating the reception quality maps.

8. The wireless access system as claimed in claim 6, wherein each of the mobile communication apparatuses further comprises a direct reception quality estimation circuit section configured for estimating a direct reception quality index value corresponding to direct reception of information from the fixed wireless station at the current position of the mobile communication apparatus, and a displacement-location quality estimation circuit section configured for periodically estimating a destination position expected to be reached by the mobile communication apparatus after a predetermined time interval has elapsed, and for estimating a displacement-location reception quality index value as a reception quality index value corresponding to direct reception of information from the fixed wireless station at the destination position, the estimation of the displacement-location reception quality index value being based upon the estimated destination position and the acquired reception quality map;

wherein when the direct reception quality index value exceeds a predetermined threshold value, the reception processing circuit section selects the first reception mode as the operation mode and thereby initiates or continues direct reception of information from the fixed wireless station, and when the direct reception quality index value does not exceed the threshold value, the reception processing circuit section: and compares the direct reception quality index value with the displacement-location reception quality index value, selects the first reception mode as the operation mode when the displacement-location reception quality index value does not exceed the direct reception quality index value, and selects the second reception mode as the operation mode when the displacement-location reception quality index value exceeds the direct reception quality index value, the second reception mode being a mode in which direct reception of information from the fixed wireless station is postponed.

9. The wireless access system as claimed in claim 5, comprising:

a relay information acquisition circuit section configured for acquiring information identifying respective primary mobile communication apparatuses which each are currently receiving information directly from a fixed wireless station located at a fixed terrestrial position and which each are relaying information from the fixed wireless station to at least one secondary mobile communication apparatus; and an allocation determining circuit section configured for allocating an amount of communication resources to each primary mobile communication apparatus based upon a total number of secondary mobile communication apparatuses which are currently receiving information via the primary mobile communication apparatus.

10. The wireless access system as claimed in claim 9, further comprising:

a receiving apparatus judgement circuit section configured for judging when a mobile communication apparatus is located within an interference area and receives information directly from a fixed wireless station, the interference area being within a region in which respective communication areas of a plurality of fixed wireless stations mutually overlap, and an allocation command circuit section configured for supplying commands to the fixed wireless stations designating allocation of communication resources by the fixed wireless stations whereby interference between communication resources in the interference area is permitted when it is judged by the receiving apparatus judgement circuit section that there is no mobile communication apparatus located within the interference area and receiving information directly from a fixed wireless station;

wherein:

when each of one or more mobile communication apparatuses located within the interference area is receiving information from a fixed wireless station relayed via a mobile communication apparatus located outside the interference area, the receiving apparatus judgement circuit section judges that that there is no mobile communication apparatus located which is within the interference area while receiving information directly from a fixed wireless station.

11. The wireless access system as claimed in claim 5, wherein the mobile communication apparatuses are transported in respective vehicles, each of the mobile communication apparatuses further comprising:

an other-apparatus judgement circuit section configured for judging when a number of candidate relay apparatuses exceeding a predetermined number, each having a reception quality exceeding the predetermined threshold value as estimated by the reception quality estimation circuit section, are respectively positioned within a specific area centered on the current position of the mobile communication apparatus, and a vehicle control circuit section configured for controlling the vehicle transporting the mobile communication apparatus;

wherein when it is judged by the other-apparatus judgement circuit section that the number of candidate relay apparatuses does not exceed the predetermined number, the vehicle control circuit section operates to move the mobile communication apparatus to a position at which the reception quality index estimated by the direct quality estimation circuit section exceeds the predetermined threshold value.

12. The wireless access system according to claim 5, wherein the reception processing circuit section of each of the mobile communication apparatuses is configured to derive a small-area reception quality index expressing a reception quality with respect to communication between the mobile communication apparatus and the candidate relay apparatus, and to inhibit selection of the second reception mode when the small-area reception quality index does not exceed a predetermined threshold value.

* * * * *